United States Patent
Henderson et al.

(10) Patent No.: US 7,516,596 B2
(45) Date of Patent: *Apr. 14, 2009

(54) BANDOLIER FORMAT PACKAGING

(75) Inventors: Eric Thomas Henderson, Dallas, TX (US); Garrett William Kohl, Allen, TX (US); Steven Kenneth Tucker, Hurst, TX (US)

(73) Assignee: Frito-Lay North America, Inc., Plano, TX (US)

( * ) Notice: Subject to any disclaimer, the term of this patent is extended or adjusted under 35 U.S.C. 154(b) by 28 days.

This patent is subject to a terminal disclaimer.

(21) Appl. No.: 11/103,770

(22) Filed: Apr. 12, 2005

(65) Prior Publication Data

US 2005/0238766 A1 Oct. 27, 2005

Related U.S. Application Data

(63) Continuation-in-part of application No. 10/721,953, filed on Nov. 25, 2003, now Pat. No. 6,935,086, which is a continuation-in-part of application No. 10/100,370, filed on Mar. 18, 2002, now Pat. No. 6,722,106.

(51) Int. Cl.
*B65B 11/58* (2006.01)
*B65B 61/02* (2006.01)
*B65B 63/04* (2006.01)
*B65B 9/20* (2006.01)
*B65D 75/42* (2006.01)
*B65H 5/28* (2006.01)

(52) U.S. Cl. .............................. 53/411; 53/429; 53/449; 53/451; 53/131.5; 53/116; 53/551; 53/591; 206/494; 221/70; 221/281

(58) Field of Classification Search .................. 53/591, 53/429, 116, 451, 551, 449, 412, 133.1, 133.3, 53/411, 131.5; 221/70, 281; 206/494
See application file for complete search history.

(56) References Cited

U.S. PATENT DOCUMENTS 2,194,451 A * 3/1940 Soubier ...................... 206/526

(Continued)

FOREIGN PATENT DOCUMENTS

GB 2101909 5/2001

(Continued)

OTHER PUBLICATIONS

"Votocel-Filmes Flexiveis Ltd—Biaxially Oriented Polypropylene Film (BOPP) for Flexible Packaging," posted by Votocel-Filmes Flexiveis Ltd, Votorantim, Brazil, at http://www.packaging-technology.com/contractors/materials/votocel/, printed on Oct. 8, 2003.

(Continued)

*Primary Examiner*—Stephen F Gerrity
(74) *Attorney, Agent, or Firm*—Colin P. Cahoon; Bobby W. Braxton; Carstens & Cahoon, LLP

(57) ABSTRACT

A product and method for producing a string of individual sealed, filled packages separated by perforations. A string of separate packages optionally may be enclosed in a cardboard or other container designed to sit in a pantry or other location for dispensing of individual units. Perforations in the packaging film between separate packages provide a tear point to aid in separating one package from the next. There are several advantages to this format including easy placement of the string of packages into a carton for shipping or dispensing, and the ability to hang a string of packages in locations without the need to attach the packages to a backing strip. The perforations between packages facilitate the packaging and transportation of the entire string or bandolier, and facilitate the removal and use of a separate package.

3 Claims, 15 Drawing Sheets

U.S. PATENT DOCUMENTS

| | | | | |
|---|---|---|---|---|
| 2,248,471 | A * | 7/1941 | Stroop | 53/412 |
| 2,260,064 | A * | 10/1941 | Stokes | 53/415 |
| 2,385,897 | A * | 10/1945 | Waters | 53/134.1 |
| 2,836,291 | A * | 5/1958 | Stroop | 53/449 |
| 2,978,853 | A | 4/1961 | Price | |
| 3,173,601 | A * | 3/1965 | Osborn, Jr. | 383/37 |
| 3,199,756 | A * | 8/1965 | Davy | 226/76 |
| 3,309,834 | A * | 3/1967 | Buttery | 53/429 |
| 3,372,797 | A * | 3/1968 | Grevich | 206/484 |
| 3,385,024 | A * | 5/1968 | Piazze et al. | 53/412 |
| 3,397,505 | A * | 8/1968 | Critchell | 53/74 |
| 3,485,349 | A * | 12/1969 | Chaney, Jr. | 206/209 |
| 3,537,636 | A | 11/1970 | Rochette | |
| 3,647,060 | A * | 3/1972 | Kiely | 206/389 |
| 3,719,021 | A * | 3/1973 | Rosenberg | 53/551 |
| 3,785,112 | A | 1/1974 | Leasure et al. | |
| 3,785,636 | A | 1/1974 | Bitting et al. | |
| 3,846,569 | A * | 11/1974 | Kaplan | 426/394 |
| 4,194,438 | A | 3/1980 | Schmachtel | |
| 4,597,103 | A | 6/1986 | Hoover | |
| 4,604,852 | A * | 8/1986 | Becker | 53/444 |
| 4,604,854 | A | 8/1986 | Andreas | |
| 4,894,975 | A | 1/1990 | Ausnit | |
| 4,913,561 | A | 4/1990 | Beer | |
| 4,925,438 | A | 5/1990 | Wagner | |
| 4,979,617 | A | 12/1990 | Benoit | |
| 4,986,054 | A | 1/1991 | McMahon | |
| 5,030,190 | A | 7/1991 | Woods et al. | |
| 5,046,300 | A | 9/1991 | Custer et al. | |
| 5,094,657 | A * | 3/1992 | Dworak et al. | 493/208 |
| 5,127,208 | A | 7/1992 | Custer et al. | |
| 5,150,561 | A * | 9/1992 | Muckenfuhs | 53/412 |
| 5,170,608 | A | 12/1992 | Petry et al. | |
| 5,242,516 | A | 9/1993 | Custer et al. | |
| 5,322,579 | A | 6/1994 | Van Erden | |
| 5,345,750 | A * | 9/1994 | Gries et al. | 53/553 |
| 5,398,486 | A | 3/1995 | Kauss et al. | |
| 5,400,565 | A | 3/1995 | Terminella et al. | |
| RE34,905 | E | 4/1995 | Ausnit | |
| 5,412,924 | A | 5/1995 | Ausnit | |
| 5,425,216 | A | 6/1995 | Ausnit | |
| 5,505,037 | A | 4/1996 | Terminella et al. | |
| 5,540,032 | A * | 7/1996 | Sosnik et al. | 53/415 |
| 5,551,208 | A | 9/1996 | Van Erden | |
| 5,561,966 | A | 10/1996 | English | |
| 5,564,259 | A | 10/1996 | Stolmeier | |
| 5,590,783 | A | 1/1997 | Capy et al. | |
| 5,689,933 | A * | 11/1997 | Weder et al. | 53/399 |
| 5,746,043 | A | 5/1998 | Terminella et al. | |
| 5,768,852 | A | 6/1998 | Terminella et al. | |
| 5,768,969 | A | 6/1998 | Dalfiume | |
| 5,862,652 | A | 1/1999 | Schoeler | |
| 5,887,722 | A * | 3/1999 | Albrecht et al. | 206/714 |
| 5,930,983 | A | 8/1999 | Terminella et al. | |
| 6,021,919 | A * | 2/2000 | Kelly | 221/281 |
| 6,029,428 | A | 2/2000 | Terminella et al. | |
| 6,047,521 | A | 4/2000 | Terminella et al. | |
| 6,145,282 | A | 11/2000 | Tsuruta | |
| 6,398,412 | B2 | 6/2002 | Wedi et al. | |
| 6,560,948 | B1 * | 5/2003 | Fuss et al. | 53/459 |
| 6,609,999 | B2 | 8/2003 | Albright | |
| 6,615,567 | B2 | 9/2003 | Kuhn et al. | |
| 6,802,172 | B1 * | 10/2004 | Rouse et al. | 53/412 |
| 6,935,086 | B2 * | 8/2005 | Brenkus et al. | 53/411 |
| 2003/0009989 | A1 | 1/2003 | Knoerzer et al. | |
| 2003/0230052 | A1 | 12/2003 | Rabiea | |

FOREIGN PATENT DOCUMENTS

| | | |
|---|---|---|
| JP | 2191159 | 7/1990 |
| JP | 6-305057 | 11/1994 |
| JP | 2000-190908 | 7/2000 |
| JP | 2001-206307 | 7/2001 |
| WO | PCT-FR93-00303 | 10/1993 |

OTHER PUBLICATIONS

"Flo-Wrappers, Die Fold Wrappers, Vertical Form Fill and Seal, and Stand-Up Pouch," posted by Bay Area Packaging at http://www.baypack.com/wrappers.htm, printed on Nov. 18, 2003.

"High Technology, Quality, Durable, Designed for 24-hour Operation," posted by Mega Pack S.A. at http://www.megapack.gr/mixanimatauk.html, printed on Nov. 18, 2003.

* cited by examiner

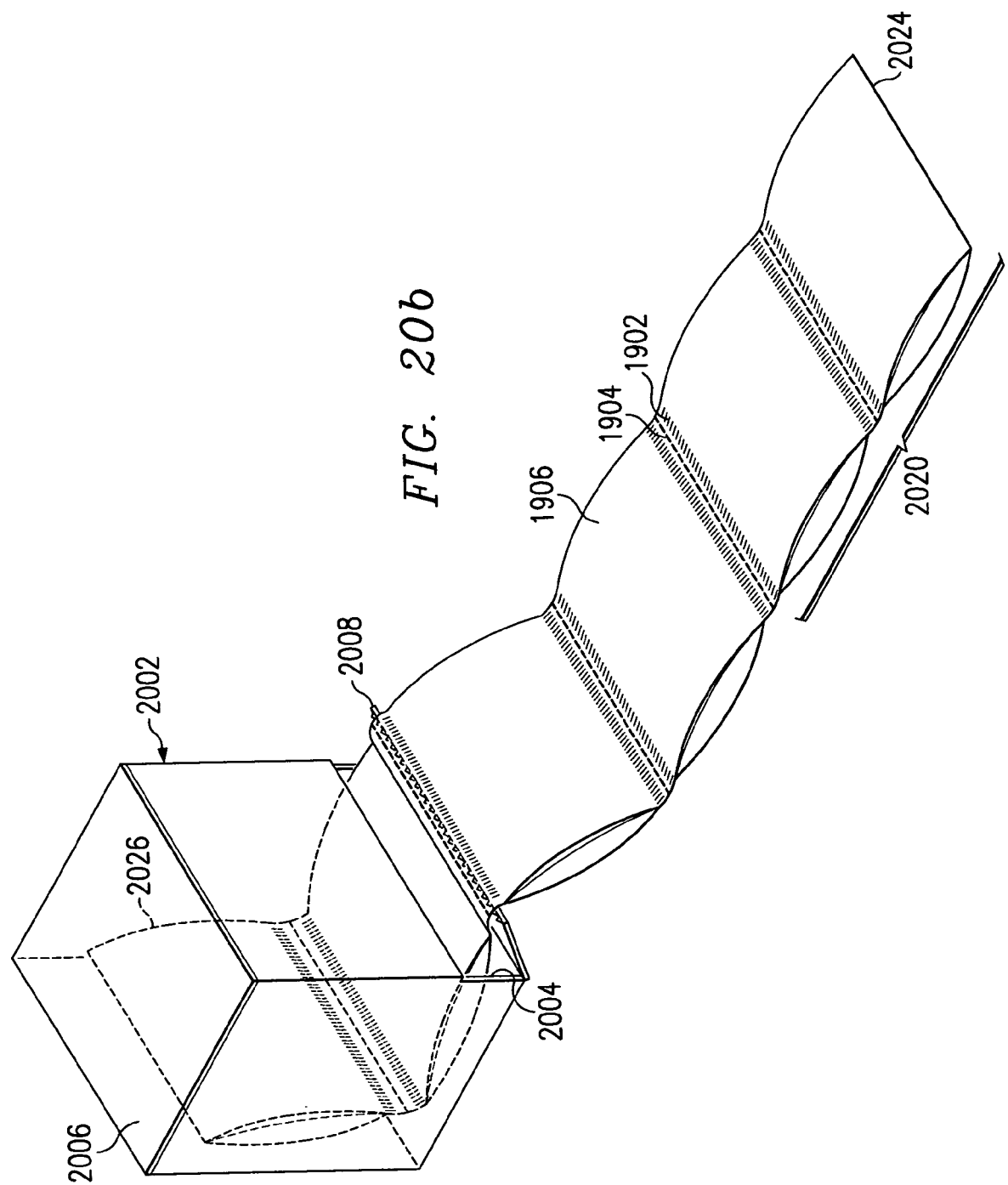

BANDOLIER FORMAT PACKAGING

CROSS-REFERENCE TO RELATED APPLICATIONS

This application is a continuation-in-part of U.S. application Ser. No. 10/721,953, entitled "Double-Bag Package and Perforation Knife" and filed on Nov. 25, 2003, now U.S. Pat. No. 6,935,086, which application is itself a continuation-in-part of U.S. application Ser. No. 10/100,370, entitled "Vertical Stand-Up Pouch" and filed on Mar. 18, 2002, now U.S. Pat. No. 6,722,106.

BACKGROUND

1. Technical Field

The present invention relates to a double-bag package constructed using a modified vertical form and fill packaging machine and a modified perforation knife, and the method for making same, that provides for a single piece construction of a package having two horizontally adjacent bags joined together by a perforated vertical seal having self-correcting directional perforations. The package is suitable for retail snack food distribution. The invention allows for use of existing film converter and packaging technology to produce a double-bag package with minimal increased costs and minimal modification. Further, this invention relates to creating a string of connected individual packages separated by perforations between each package. A string of packages can thus be further packaged, labeled, handled, shipped, sold, and used.

2. Description of Related Art

Vertical Form, Fill and Seal Machines

Vertical form, fill and seal packaging machines are commonly used in the snack food industry for forming, filling and sealing bags of chips and other like products. Such packaging machines take a packaging film from a sheet roll and form the film into a vertical tube around a product delivery cylinder. The vertical tube is vertically sealed along its length to form a back seal. The machine applies a pair of heat-sealing jaws or facings against the tube to form a transverse seal. This transverse seal acts as the top seal on the bag below and the bottom seal on the package being filled and formed above. The product to be packaged, such as potato chips, is dropped through the product delivery cylinder, into the formed tube, and is held within the tube above the bottom transverse seal. After the package has been filled, the film tube is pushed downward to draw out another package length. A transverse seal is formed above the product, thus sealing it within the film tube and forming a package of product. The package below said transverse seal is separated from the rest of the film tube by cutting across the sealed area.

One such packaging machine is seen diagrammatically in FIG. 9. This drawing is simplified, and does not show the cabinet and support structures that typically surround such a machine, but it demonstrates the working of the machine well. Packaging film 910 is taken from a roll 912 of film and passed through tensioners 914 that keep it taut. The film then passes over a former 916, which directs the film into a vertical tube around a product delivery cylinder 918. As the tube is pulled downward by drive belts 920, the vertical tube of film is sealed along its length by a vertical sealer 922, forming a back seal 924. The machine then applies a pair of heat-sealing jaws 926 against the tube to form a transverse seal 928. This transverse seal 928 acts as the top seal on the bag 930 below the sealing jaws 926 and the bottom seal on the bag 932 being filled and formed above the jaws 926. After the transverse seal 928 has been formed, a cut is made across the sealed area to separate the finished bag 930 below the seal 928 from the partially completed bag 932 above the seal. The film tube is then pushed downward to draw out another package length. Before the sealing jaws form each transverse seal, the product to be packaged is dropped through the product delivery cylinder 918 and is held within the tube above the transverse seal 928.

The material that is fed into the form, fill and seal machine is typically a packaging film, such as polypropylene, polyester, paper, polyolefin extrusions, adhesive laminates, and other such materials, or from layered combinations of the above. For many food products, where flavor retention is important, a metalized layer will form the innermost layer.

The form, fill and seal machines are quite expensive, in the range of $250,000 each, but pay for themselves easily when compared to the cost of pre-formed bags and the machinery to fill them. However, in order to maximize the productivity of the form, fill and seal machines, it is common for the product delivery tube 918 and former 916 to be made as a unit that is easily interchangeable in less than 15 minutes. The length of the transverse seal can also be changed, by exchanging the sealing jaws, or in some cases, merely by exchanging the facing (the portion of the sealing jaws which actually makes contact with the packaging film). By changing these elements, as well as the width of film roll feeding into the machine and the programming of the machine, one form, fill and seal machine can handle a number of different products in different size packages, limited primarily by the width of film the machine will handle, the maximum length of bag the machine is designed to handle, and the available former/delivery tube assemblies.

Packaging Film

The packaging film used in such process is typically a composite polymer material produced by a film converter. For example, one prior art composite film used for packaging potato chips and like products is illustrated in FIG. 1, which is a schematic of a cross-section of the film illustrating each individual substantive layer. FIG. 1 shows a sealable inside, or product side, layer 16 which typically comprises metalized oriented polypropylene ("OPP") or metalized polyethylene terephtalate ("PET"). This is followed by a laminate layer 14, typically a polyethylene extrusion, and an ink or graphics layer 12. The ink layer 12 is typically used for the presentation of graphics that can be viewed through a transparent outside layer 10, which layer 10 is typically OPP or PET.

The prior art film composition shown in FIG. 1 is ideally suited for use on vertical form and fill machines for the packaging of food products. The metalized inside layer 16, which is usually metalized with a thin layer of aluminum, provides excellent barrier properties. The use of OPP or PET for the outside layer 10 and the inside layer 16 further makes it possible to heat seal any surface of the film to any other surface in forming either the transverse seals or back seal of a package.

Typical back seals formed using the film composition shown in FIG. 1 are illustrated in FIGS. 2a and 2b. FIG. 2a is a schematic of a "lap seal" embodiment of a back seal being formed on a tube of film. FIG. 2b illustrates a "fin seal" embodiment of a back seal being formed on a tube of film.

With reference to FIG. 2a, a portion of the inside metalized layer 26 is mated with a portion of the outside layer 20 in the area indicated by the arrows to form a lap seal. The seal in this area is accomplished by applying heat and pressure to the film in such area. The lap seal design shown in FIG. 2a insures that the product to be placed inside the formed package will be protected from the ink layer by the metalized inside layer 26.

The fin seal variation shown in FIG. 2b also provides that the product to be placed in the formed package will be protected from the ink layer by the metalized inside layer 26. Again, the outside layer 20 does not contact any product. In the embodiment shown in FIG. 2b, however, the inside layer 26 is folded over and then sealed on itself in the area indicated by the arrows. Again, this seal is accomplished by the application of heat and pressure to the film in the area illustrated.

Packaging

Regardless of whether a lap seal or fin seal is used for constructing a standard package using a vertical form and fill packaging machine, the end result is a package as shown in FIG. 3a with horizontally oriented top and bottom transverse seals 31, 33. Such package is referred to in the art as a "vertical flex bag" or "pillow pouch," and is commonly used for packaging snack foods such as potato chips, tortilla chips, and other various sheeted and extruded products. The back seal discussed with reference to FIGS. 2a and 2b runs vertically along the bag and is typically centered on the back of the package shown in FIG. 3a, thus not visible in FIG. 3a. Because of the narrow, single edge base on the package shown in FIG. 3a formed by the bottom transverse seal 33, such prior art packages are not particularly stable when standing on one end. This shortcoming has been addressed in the packaging industry by the development of a horizontal stand-up pouch such as the embodiment illustrated in FIGS. 4a, 4b, and 4c. As can be seen by reference to said figures, such horizontal stand-up pouch has a relatively broad and flat base 47 having two contact edges. This allows for the pouch to rest on this base 47 in a vertical presentation. Manufacture of such horizontal stand-up pouches, however, does not involve the use of standard vertical form, fill, and seal machines but, rather, involves an expensive and relatively slow 3-piece construction using a pouch form, fill, and seal machine.

Referring to FIGS. 4b and 4c, the horizontal stand-up pouch of the prior art is constructed of three separate pieces of film that are mated together, namely, a front sheet 41, a rear sheet 43, and a base sheet 45. The front sheet 41 and rear sheet 43 are sealed against each other around their edges, typically by heat sealing. The base sheet 45 is, however, first secured along its outer edges to the outer edges of the bottom of the front sheet 41 and rear sheet 43, as is best illustrated in FIG. 4c. Likewise, the mating of the base sheet 45 to the front sheet 41 and the rear sheet 43 is also accomplished typically by a heat seal. The requirement that such horizontal stand-up pouch be constructed of three pieces results in a package that is significantly more expensive to construct than a standard form and fill vertical flex bag.

Further disadvantages of using horizontal stand-up pouches include the initial capital expense of the horizontal stand-up pouch machines, the additional gas flush volume required during packaging as compared to a vertical flex bag, increased down time to change the bag size, slower bag forming speed, and a decreased bag size range. For example, a Polaris model vertical form, fill, and seal machine manufactured by Klick Lock Woodman of Georgia, USA, with a volume capacity of 60-100 bags per minute costs in the range of $75,000.00 per machine. A typical horizontal stand-up pouch manufacturing machine manufactured by Roberts Packaging of Battle Creek, Mich., with a bag capacity of 40-60 bags per minute typically costs $500,000.00. The film cost for a standard vertical form, fill, and seal package is approximately $0.04 per bag with a comparable horizontal stand-up pouch costing roughly twice as much. Horizontal stand-up pouches further require more than twice the oxygen or nitrogen gas flush. Changing the bag size on a horizontal stand-up pouch further takes in excess of two hours, typically, while a vertical form and fill machine bag size can be changed in a matter of minutes. Also, the typical bag size range on a horizontal stand-up pouch machine is from 4 oz. to 10 oz., while a vertical form and fill machine can typically make bags in the size range of 1 oz. to 24 oz.

One advantage of a horizontal stand-up pouch machine over a vertical form and fill machine, however, is the relatively simple additional step of adding a zipper seal at the top of the bag for reclosing of the bag. Vertical form and fill machines typically require substantial modification and/or the use of zipper seals premounted on the film oriented horizontally to the seal facings used to seal the horizontal transverse seals.

An alternative approach taken in the prior art to producing a bag with more of a stand-up presentation is the construction of a flat bottom bag such as illustrated in FIG. 3b. Such bag is constructed in a method very similar to that described above with regard to prior art pillow pouches. However, in order to form the vertical gussets 37 on either side of the bag, the vertical form, fill, and seal machine must be substantially modified by the addition of two movable devices on opposite sides of the sealing carriage that move in and out to make contact with the packaging film tube in order to form the tuck that becomes the gussets 37 shown in FIG. 3b. Specifically, when a tube is pushed down to form the next bag, two triangular shaped devices are moved horizontally towards the packaging film tube until two vertical tucks are formed on the packaging film tube above the transverse seals by virtue of contact with these moving triangular shaped devices. While the two triangular shaped devices are thus in contact with the packaging tube, the bottom transverse seal is formed. The package is constructed with an outer layer 30 that is non-sealable, such as paper. This causes the formation of a V-shaped gusset 37 along each vertical edge of the package when the transverse seals 31, 33 are formed. While the triangular shaped devices are still in contact with the tube of packaging material, the product is dropped through the forming tube into the tube of packaging film that is sealed at one end by virtue of the lower transverse seal 33. The triangular shaped devices are then removed from contact with the tube of packaging film and the film is pushed down for the formation of the next package. The process is repeated such that the lower transverse seal 33 of the package above and upper transverse seal 31 of the package below are then formed. This transverse seal is then cut, thereby releasing a formed and filled package from the machine having the distinctive vertical gussets 37 shown in FIG. 3b.

The prior art method described above forms a package with a relatively broad base due to the V-shaped vertical gussets 37. Consequently, it is commonly referred to in the art as a flat bottom bag. Such flat bottom bag is advantageous over the previously described horizontal stand-up pouch in that it is formed on a vertical form, fill, and seal machine, albeit with major modifications. However, the prior art method of making a flat bottom bag has a number of significant drawbacks. For example, the capital expense for modifying the vertical form, fill, and seal machine to include the moving triangular-shaped devices is approximately $30,000.00 per machine. The changeover time to convert a vertical form, fill, and seal machine from a standard pillow pouch configuration to a stand-up bag configuration can be substantial, and generally in the neighborhood of one-quarter man hours. The addition of all of the moving parts required for the triangular-shaped devices to move in and out of position during each package formation cycle also adds complexity to the vertical form, fill, and seal machine, inevitably resulting in maintenance issues. Importantly, the vertical form, fill, and seal machine modified to include the moving triangular-shaped devices is significantly slower than a vertical form, fill, and seal machine without such devices because of these moving components that form the vertical gussets. For example, in the formation of a six inch by nine inch bag, the maximum run speed for a modified vertical form, fill, and seal machine using the triangular-shaped moving devices is in the range of 15 to 20 bags per minute. A standard vertical form, fill, and seal machine without such modification can construct a similarly sized pillow pouch at the rate of approximately 40 bags per minute.

Multipacks

A popular marketing concept is that of packaging two or more individually sealed items together. While the marketing idea of multi-packs may be simple, the translation of that idea to current packaging technology can be more difficult. Often, rather than packaging a product into several different packages at the same time, each package is separately produced, as usual, then the various packages are boxed together or overwrapped to form a multi-pack. It would be preferable to be able to produce multiple packages fastened together for sales, but which could be separated by the consumer for convenience.

One example of a prior art multi-pack package is disclosed in U.S. patent application Ser. No. 10/100,360, Publication No. US 2003/0009989. FIG. 5a is a perspective view of a multi-pack package 500 in accordance with the '360 application. FIG. 5b is a top-down cross-sectional view of the multi-pack package 500 shown in FIG. 5a. The multi-pack package 500 has two side-by-side bags 510a, 510b attached together by a vertical seal 506 having perforations 508. The package also has top and bottom horizontal/transverse seals 502, 504, as well as vertical gussets on the left and right sides of the package. The double-bag package of the '360 application provides consumers with two containers conveniently fastened together. However, there are several disadvantages to the '360 application's multi-pack package and method for making the package.

One disadvantage is that the package 500 requires a special, complex vertical form, fill and seal (VFFS) machine having two feed tubes. FIG. 6a is a front view of the former/delivery tube assembly of such of a twin-feed VFFS machine, and FIG. 6b is a side view of the former/delivery tube assembly shown in FIG. 6a. FIG. 7 is a cross-section of the former/delivery tube assembly taken at point 7-7' of FIG. 6b, and FIG. 8 is a cross-section of the former/delivery tube assembly taken at point 8-8' of FIG. 6b. A twin-feed VFFS having a special former/delivery tube assembly such as that depicted in FIG. 6a has a greater initial capital cost than a traditional VFFS machine. Furthermore, such a modified twin-feed VFFS machine requires a substantially wider film stock than traditional VFFS machines. The use of non-standard film stock and former/delivery tube assemblies undesirably increases the capital and operating costs. Additionally, no equipment currently exists to make seals wider than 18 inches, severely limiting bag sizes.

Another disadvantage is that each container of the multi-pack package disclosed in the '360 application has more restrictive extremities than does a pillow pouch (or vertical flex bag), such as that shown in FIG. 3a, formed from a traditional VFFS machine. Whereas a traditional pillow pouch bag has flat seals on only two opposing sides, each container of the multi-pack package shown in the '360 application, which is depicted in FIG. 5a, has flat seals on every side but one. Each flat seal flattens the package in the surrounding area, thus decreasing the available volume within the package. Because the multi-pack package disclosed in the '360 application has more flat seals per container than traditional pillow pouches, the multi-pack package disclosed therein has less available volume for product than traditional pillow pouches.

FIG. 5c is a perspective view of a prior art saddle-bag package, which is another example of a multi-pack package. The saddle-bag package 550 comprises two pouch-type bags 552, 554 that share a top transverse seal 558. The saddle-bag package 550 is typically oriented so that the back sides of each of the connected pouches 552, 554 face each other. The package 550 then stands on the bottom transverse seals 556, 560 of each pouch 552, 554. The graphics and/or text on both pouches 552, 554 of the saddle-bag package 550 typically appear upright when the package 550 is so positioned. When forming saddle-bag packages using a vertical form, fill and seal machine, the film feed typically has graphics/text units that alternate between upside-down and right-side up and are linked together vertically (as a column of graphical/text units as opposed to a row of graphical/text units). Printing graphics and/or text units in such an alternating fashion can require modifications to the printing process and thus undesirably increase costs.

Perforations and Perforating Knife

It is well known in the art that films or sheets can be perforated to make such films or sheets easily separated into two or more pieces. Perforations allow films or sheets of material to be more controllably torn along a perforation path. FIG. 12 is an elevated top view of a common prior art perforation pattern comprising a series of oval-shaped perforations 1220 that are spaced along a perforation path 1210 in a film 1202. Such oval-shaped perforations 1220 are often formed using an anvil and a rotating perforating wheel having oval-shaped blades or punchers. FIG. 13 is an elevated top view of another common prior art perforation pattern comprising a series of I-shaped perforations 1330 that are spaced along a perforation path 1310 in a film 1302. Such I-shaped perforations 1330 can be formed using an anvil and a rotating perforating wheel having I-shaped blades or punchers, or they can be formed using a perforating blade having teeth that form I-shaped incisions.

While films having little or no orientation, such as low-density polyethylene (LDPE), are generally more resistant to tearing than oriented films, once a tear is initiated in films having low orientation, it will generally propagate in the direction of the tearing force. Thus, a tear initiated along a perforation path in a low-orientation film tends to propagate predictably from one perforation to the next. In contrast, while oriented films such as biaxially oriented polypropylene (BOPP) generally have a lower tearing resistance than films having low orientation, once a tear is initiated, it will not necessarily propagate in the direction of the tearing force. This is because the tears have a tendency to propagate along the direction (or directions) of orientation/stretching. Oriented films are thus more likely to suffer from errant or stray tears than non-oriented films.

Many prior art perforation knife designs do not produce perforations that are adequate for reliable separation of oriented-film flexible packages along the desired perforation paths. The perforations created by such prior art knife designs require that the tears between perforations propagate in a straight line for separation to be successful. For example, if the film 1202 with prior art oval perforations 1220 shown in FIG. 12 comprises BOPP, errant tears 1230 will likely miss the next perforation along the perforation path 1210. Likewise, if the film 1302 with prior art I-shaped perforations 1320 shown in FIG. 13 comprises BOPP, an errant tear 1330 propagating from the end of an I-shaped perforation will likely miss the next I-shaped perforation 1320 along the perforation path 1310. While the use of certain expensive films, such as polyester (PET), can improve the predictability of tearing, it still does not provide a fail-safe solution. Thus, it would be desirable to have a perforation pattern capable of capturing and redirecting errant tears for fail-safe separation. It would be desirable to have a perforation knife for creating such perforation patterns. Furthermore, it would be desirable to have a low-cost oriented packaging film with more predictable tearing properties.

Bandolier Packaging

Several patents disclose packaging inventions wherein vertically adjacent packages are connected. For example, U.S. Pat. No. 4,979,617 granted to Benoit on Dec. 25, 1990, describes a dispensing system for a bundle of continuous and severable packages wherein perforations separate individual packages. However, Benoit '617 does not describe having any product in each package, but discloses shipping a string of empty packages that may be subsequently filled and separated by tearing a perforation in the packaging film between each package. Further, Benoit '617 does not disclose use of such packages with a vertical form, fill and seal machine.

U.S. Pat. No. 5,094,657 granted to Dworak on Mar. 10, 1992, discloses a method of creating a continuous strip of pouches during manufacturing and filling each one with a product. Dworak '657 describes folding, sealing, and perforating a film material to form a strip of open pouches as shown in FIG. 19. A heat seal 1902 is formed on both sides of a perforation 1904 across the folded width of a film. Heat seals 1902 create compartments, open ended envelopes, or pouches 1906. A strip of pouches then moves along a conveyor, where each pouch is blown open by forced air, a product is pushed into the open package, and the pouch 1906 is sealed. Each sealed package is then separated at the perforation for further packaging and transportation as individual units. However, Dworak '657 does not disclose shipping a connected string of packages, selling such connected string, and allowing consumers to separate packages from the string. Dworak '657 also does not disclose creating such a string of packages with a vertical form, fill and seal machine.

U.S. Patent Application published on Dec. 18, 2003 by Rabiea and having Ser. No. 10/461,047 discloses a method of supplying a continuously attached plurality of bags to be filled by a consumer. Each bag is separated from the next one by a perforated tear line. Such tear line allows a consumer to remove individual bags at the time a consumer fills a bag with a product. Rabiea '047 does not disclose filling each bag before a string of bags ships to consumers.

Consequently, a need exists for a method for forming a multi-pack package using standard vertical form, fill, and seal machine technology and a single sheet of packaging film. This method should ideally produce a double-bag package having two horizontally adjacent bags detachably connected by a perforated seal. Such method should produce such a package using a single vertical form, fill, and seal machine and a modified perforation knife. The modified perforation knife should create perforation patterns capable of capturing and redirecting errant tears for fail-safe separation along a desired perforation path.

Further, a need exists for creating a string, multi-pack, or bandolier of packages, each being filled with a product before being further packaged and transported. A further need exists for such method to be used in conjunction with a vertical form, fill and seal machine. A need exists to provide a string of packages whereby a consumer may separate an individual package from the rest of the string before consuming the contents of the package. A need exists for providing a string of packages in a dispensing container whereby a consumer may more easily isolate an individual package from the rest of the string. Further, a need exists whereby a consumer may more easily store a string of packages in a pantry or other location in such dispensing container. A need exists for providing an improved means for shipping and handling of individual packages. The present invention meets these needs and is described more fully in the detailed description below.

SUMMARY OF THE INVENTION

The proposed invention involves a method for making a novel double-bag packaging by using existing film converter and packaging technology and a modified perforation knife to produce a double-bag package with minimal increased costs and minimal modification. The method provides for a single piece construction of a package having two horizontally adjacent bags joined together by a perforated vertical seal. The package is suitable for retail snack food distribution.

An existing VFFS machine can be used with the present invention with the following minor modifications: 1) a roll of film (or other film supply) having graphics printed sideways rather than vertically, and 2) a novel perforating/cutting knife in accordance with the present invention. The manner of operation of the VFFS machine must also be slightly modified in a preferred embodiment. In particular, the heat-sealing and cutting steps must be modified to create mutli-pack packages such as double-bag packages.

The double-bag package of the present invention has two bags removably attached to each other by a perforated vertical seal. The package has three vertical seals when placed upright, with each bag having two vertical flat seals on opposite sides of the bag. The double-bag package has graphics that are properly viewable when two bags are horizontally adjacent to each other such that the transverse seals are vertically oriented. Because both product bags are formed from the same piece of film and are connected to each other, graphics and/or text can be spread across both bags, if desired. The double-bag package can also stand upright without assistance by arranging the bags in a non-linear fashion when viewed from above.

The vertical seal that connects the two bags of the double-bag package has perforations so that the two bags can be easily separated. In a preferred embodiment, the vertical seal between the two bags of a double-bag package has self-correcting perforation patterns that are capable of capturing and redirecting errant tears for fail-safe directional separation. Each of the perforation patterns has a wide base for catching an errant leading tear and at least one apex incision connecting the wide base to the desired perforation path.

Various perforating knives or blades can be used to create self-correcting perforation patterns. In a preferred embodiment, the perforating knife used with the VFFS machine has an elongate base upon which perforating teeth are located in single file. Each tooth has the shape of an oblique triangular pyramid and has three cutting edges. One face of the pyramid (the "vertical face") has a normal vector that is parallel to the elongate base of the knife.

The proposed invention also involves a method for producing a string of individual sealed, filled packages separated by perforations. This string of separate packages optionally may be enclosed in a cardboard or other container designed to sit in a pantry or other location for dispensing of individual units. The perforation of the packaging film between separate packages provides a tear point to separate one package from the next. There are several advantages to this format including easy placement of the string of packages into a carton for shipping or dispensing, and the ability to hang a string of packages in locations without the need to attach the packages to a backing strip. The perforations between packages facilitate the packaging and transportation of the entire string or bandolier, and facilitate the removal and use of separate packages.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 5b is a top-down cross-sectional view of the multi-pack package shown in FIG. 5a;

FIG. 6b is a side view of the former/delivery tube assembly shown in FIG. 6a;

FIG. 17b is a side elevational view of the perforating blade shown in FIG. 17a;

FIG. 17d is a perspective view of the perforating blade shown in FIG. 17a;

FIG. 18b is a side elevational view of the perforating blade shown in FIG. 18a.

Figure 1:
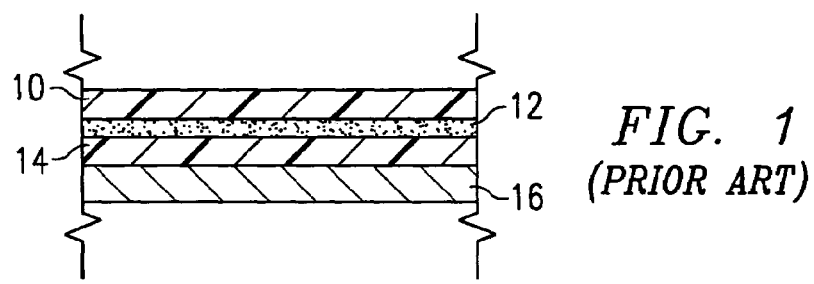
FIG. 1 is a schematic cross-section view of a prior art packaging film.
Figure 2A:
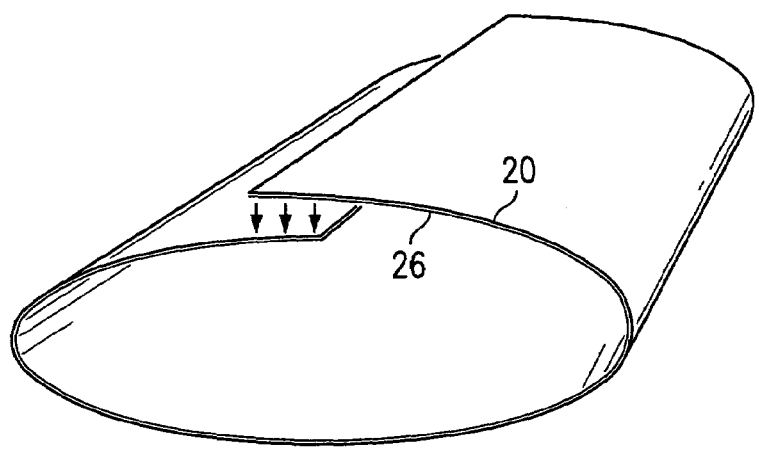
FIG. 2a is a schematic cross-section view of a tube of packaging film illustrating the formation of a prior art lap seal.
Figure 2B:
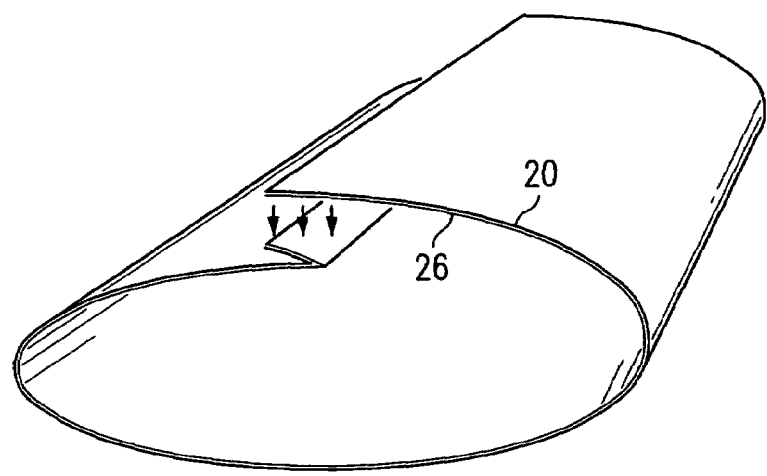
FIG. 2b is a schematic cross-section of a tube of packaging film illustrating the formation of a prior art fin seal.
Figure 3A:
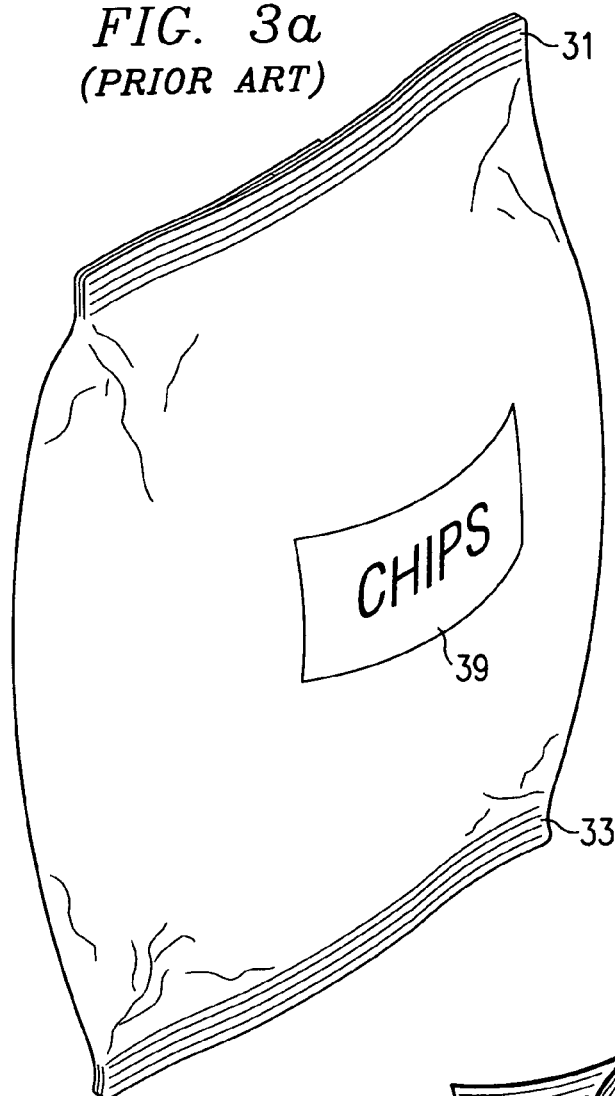
FIG. 3a is a perspective view of a prior art vertical flex bag.
Figure 3B:
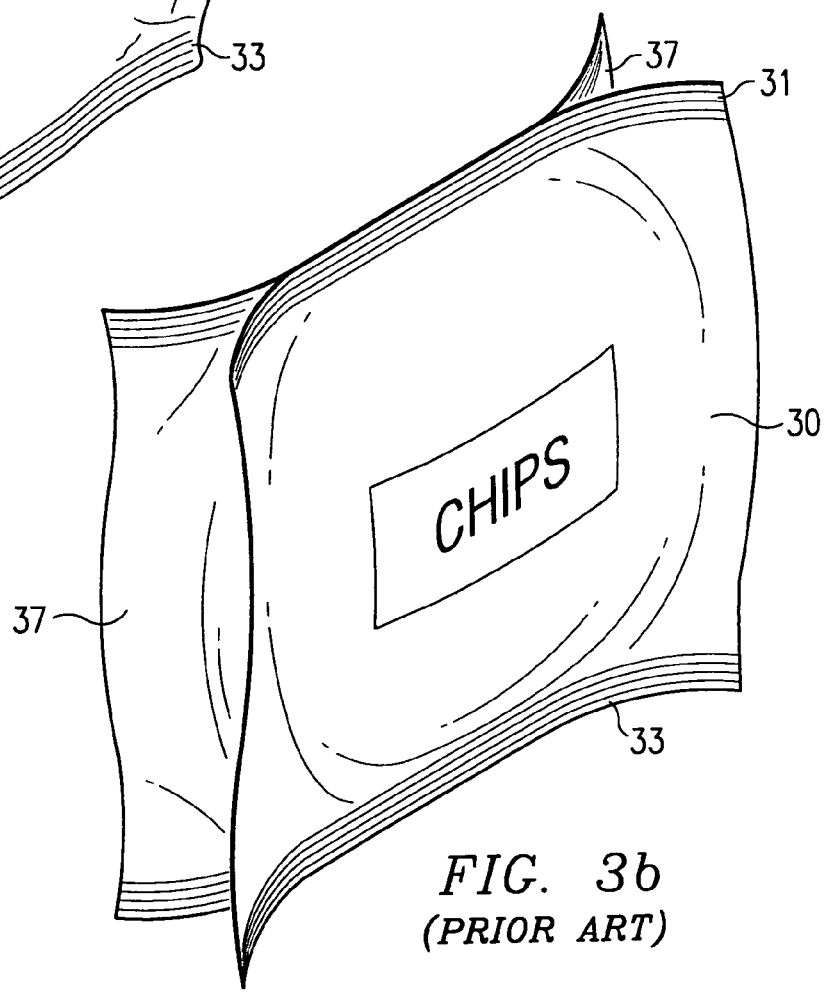
FIG. 3b is a perspective view of a prior art flat bottom bag.
Figure 4A:
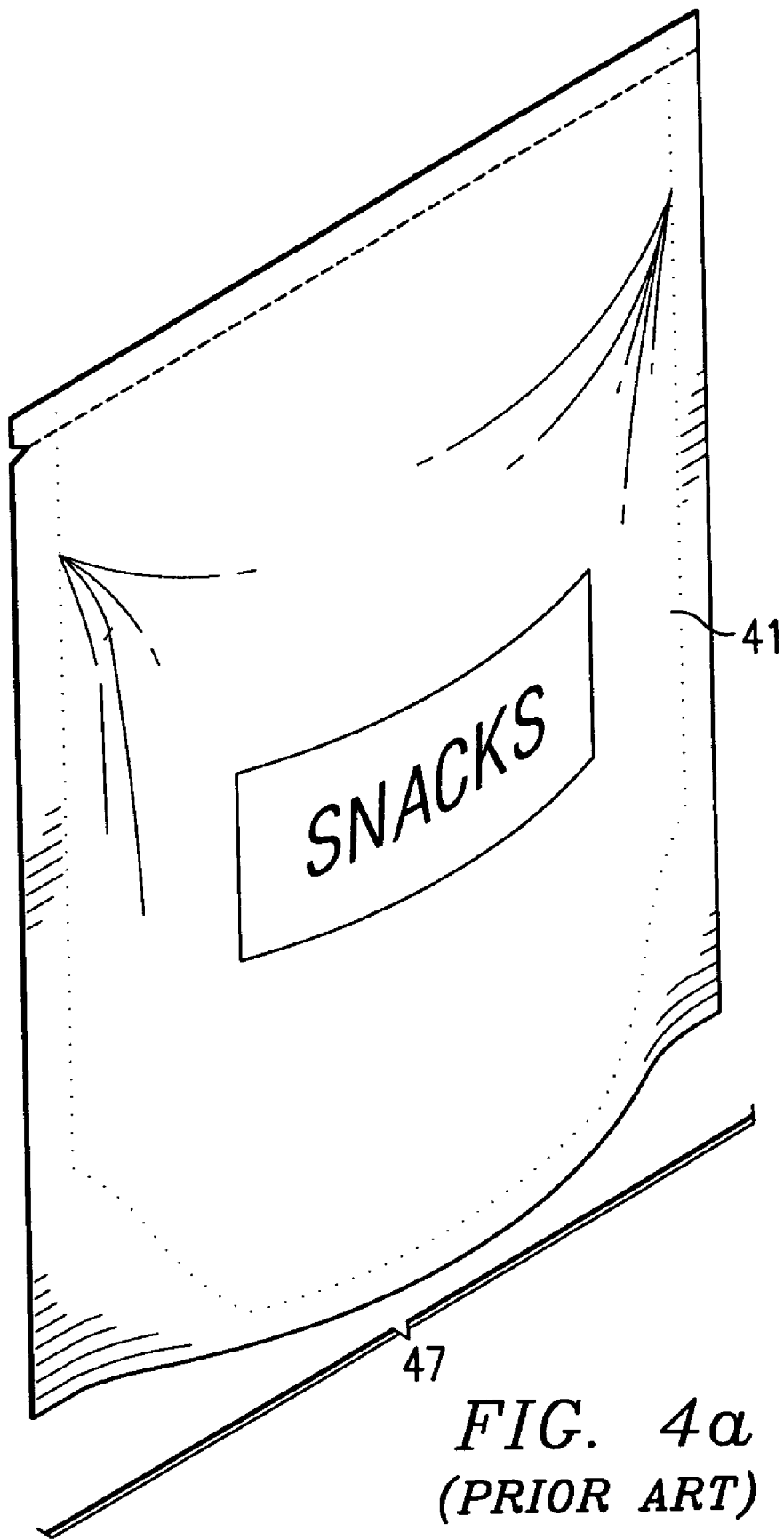
FIGS. 4a, 4b, and 4c are perspective views in elevation of a prior art horizontal stand-up pouch.
Figure 4B:
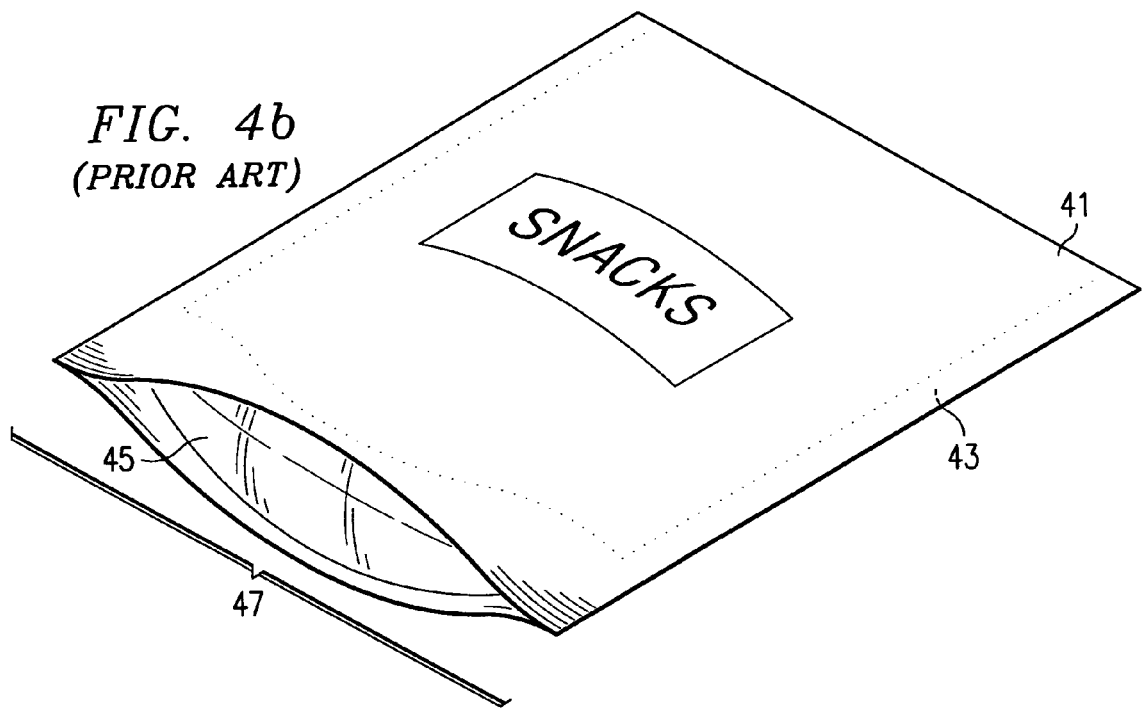
Figure 4C:
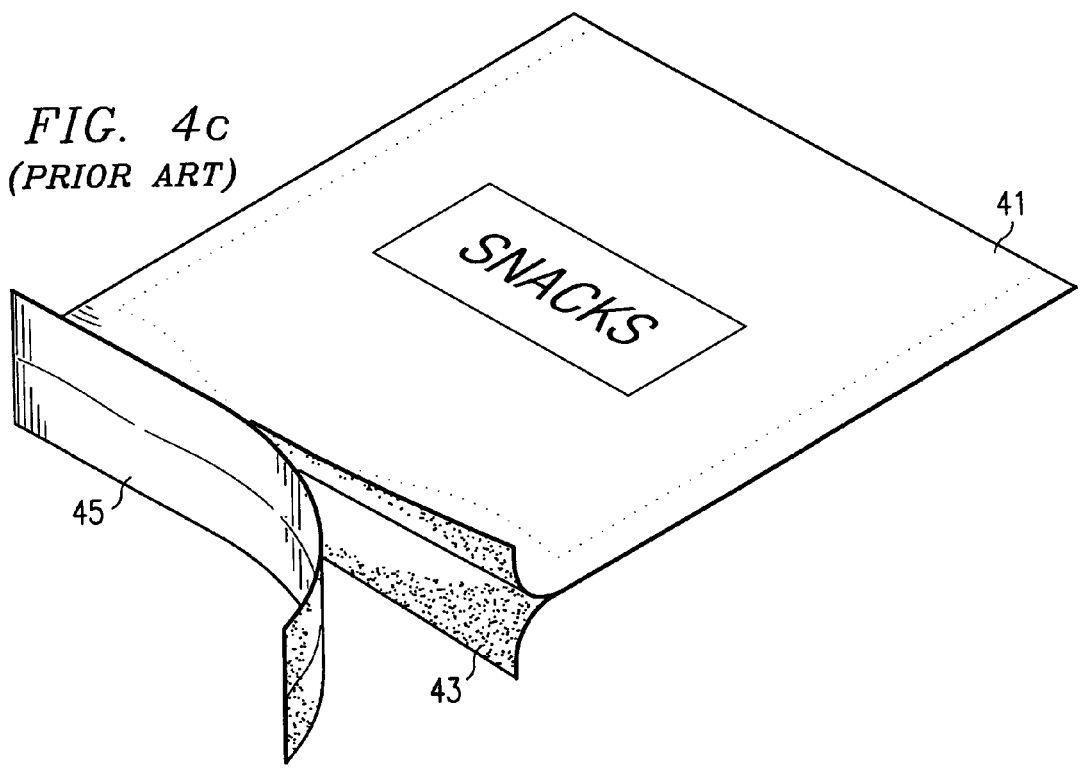

REFERENCE NUMERALS 10 transparent outside layer
12 ink layer
14 laminate layer
16 sealable or metalized inside layer
20 outside layer
30 non-sealable outer layer
31 upper transverse seal
33 lower transverse seal
37 vertical gussets
41 front sheet
43 rear sheet
45 base sheet
47 flat base
500 multi-pack package
502 top horizontal/transverse seal
504 bottom horizontal/transverse seal
506 vertical seal
508 perforation
510a, 510b side-by-side bag
550 saddle-bag package
552, 554 connected pouch-type bag
558 top transverse seal
556 bottom transverse seals
560 bottom transverse seal
910 packaging film
912 prior art film roll
914 tensioner
916 package former
918 product delivery cylinder
920 drive belts
922 vertical sealer
924 back seal
926 heat-sealing jaws
928 transverse seal
930 finished bag
932 partially completed bag
1010 multi-pack packaging film
1012 multi-pack film roll
1014 tensioners
1016 former 1018 product delivery cylinder
1020 drive belts
1022 vertical sealer
1024 back seal
1026 heat-sealing jaws
1028 transverse seal
1030 multi-pack package
1032 partially completed bag
1100 double-bag package
1110a, 1110b bag of double-bag package
1102, 1106, 1104 vertical transverse seal
1106 vertical seam
1108 perforation
1110a, 1110b bag
1112 pre-cut slit
1202 package film
1210 perforation path
1220 prior art oval perforation
1230 errant tears
1302 package film
1310 perforation path
1320 prior art I-shaped perforation
1330 I-shaped perforation
1402 film
1410 perforation path
1420 T-shaped perforation
1430 apex
1510 perforation path
1520 triangular-shaped perforations
1530 apex
1602 film
1610 perforation path
1620 perforation
1630 apex
1700 perforating knife or blade
1702 elongate base
1704 center apex
1706 centerline of cutting edge or knife
1708 vertical face of pyramid
1710 top edge line
1712 bottom contour line
1714 top ontour line
1802 elongate base
1804 center apex
1806 centerline of cutting edge or knife
1808 vertical face of pyramid
1810 tooth-bottom edge line
1814 contour line
1902 heat seal
1904 perforation separating contiguous packages
1906 individual package
2002 dispenser
2004 opening in dispenser
2006 closable flap of dispenser
2008 dispensing flap
2010 slit in closed dispenser
2020 string of packages in a dispenser
2024 exposed end of string of packages
2026 enclosed end of string of packages

DETAILED DESCRIPTION

Vertical Form, Fill and Seal Machine

Figure 9:
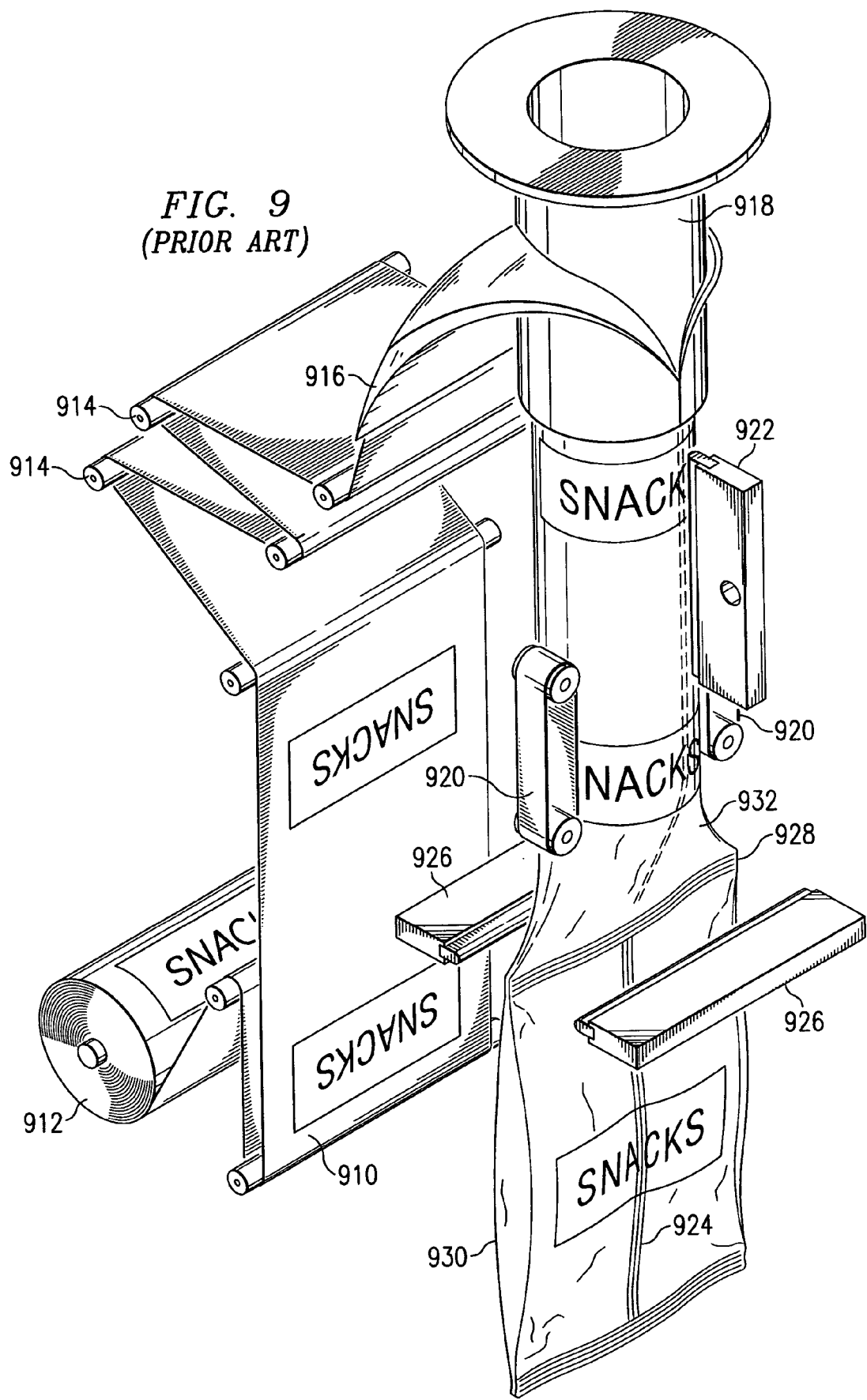
FIG. 9 is a perspective view of a prior art vertical form, fill and seal machine.
Figure 10:
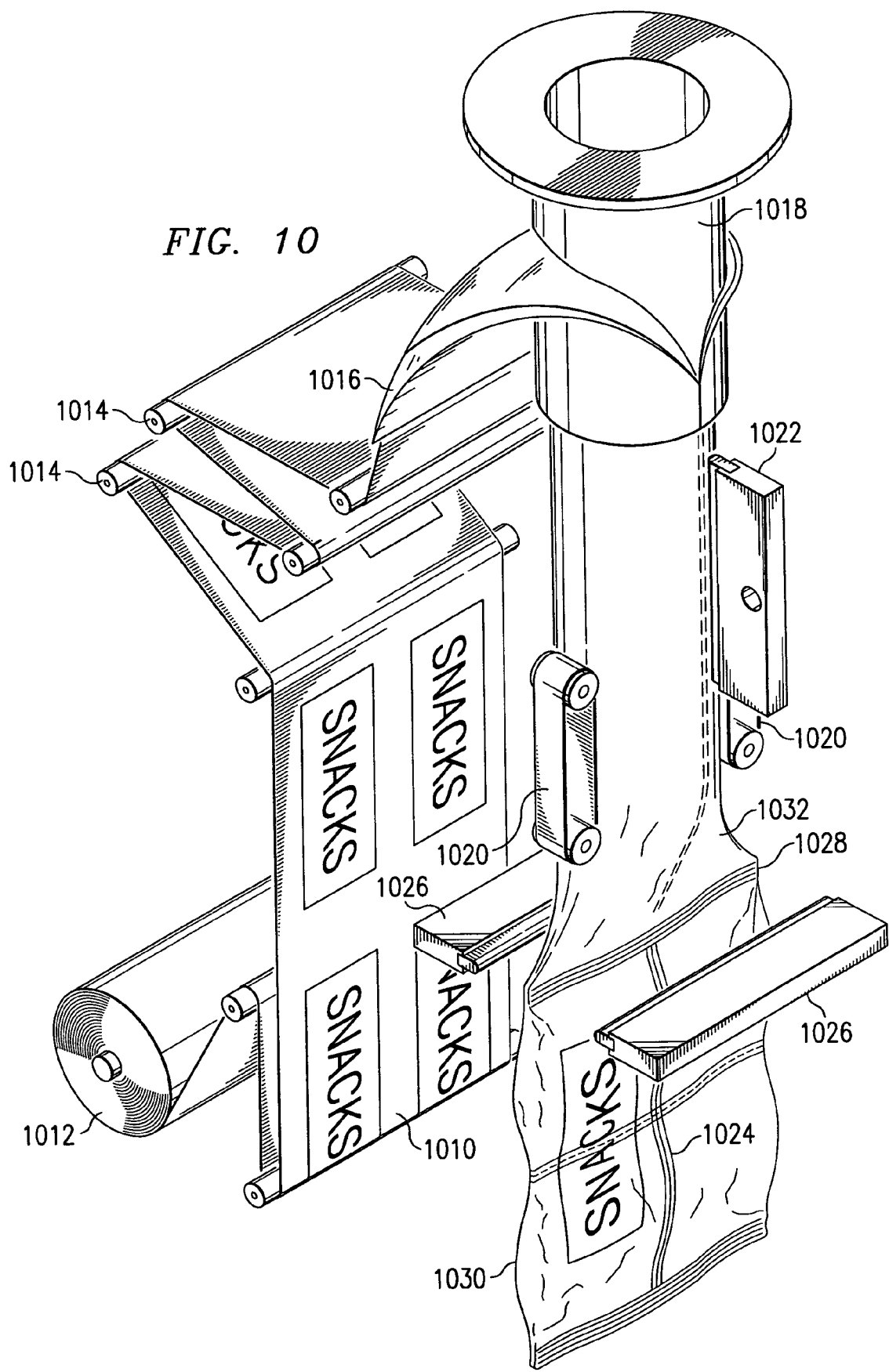
FIG. 10 is a perspective view of a vertical form, fill and seal machine being fed with film having graphics printed sideways and operated to form double-bag packages in accordance with one embodiment of the present invention.

FIG. 10 depicts a standard vertical form, fill and seal (VFFS) machine forming a roll of film 1012 into double-bag packages 1030 in accordance with a preferred embodiment of the present invention. The same reference numbers are used to identify the same corresponding elements throughout all drawings unless otherwise noted. Except for a few minor modifications, the VFFS machine itself is the same as that described above with respect to FIG. 9. In a preferred embodiment, the minor modifications include: 1) a roll of film (or other film supply) having graphics printed sideways rather than vertically, and 2) a novel perforating/cutting knife in accordance with the present invention. The manner of operation of the VFFS machine must also be slightly modified in a preferred embodiment. In particular, the heat-sealing and cutting steps must be modified to create mutli-pack packages such as double-bag packages. Note that while FIG. 10 is simplified and does not show the cabinet and support structures that typically surround such a machine, it depicts the parts that are critical to forming multi-pack packages. Note also that while a preferred method for forming a double-bag package in accordance with the present invention is explained with reference to an intermittent-motion type VFFS, other VFFS machine types, such as continuous or rotary type VFFS machines, can be used.

The material that is fed into the form, fill, and seal machine is typically a packaging film, such as polypropylene, polyester, polyethylene, paper, polyolefin extrusions, adhesive laminates, and other such materials, or from layered combinations thereof. For many food products, where flavor retention is important, a metalized layer will form the innermost layer. As explained above, the inner and outer layers of the packaging film often both comprise OPP (or BOPP). Such packaging film is typically oriented in the machine direction, which is the direction in which the film is fed and run through a VFFS machine, as well as the transverse direction (or seal direction), which is perpendicular to the machine direction. Because the packaging film is oriented in both the machine direction and the transverse direction, it can be quite difficult to reliably and controllably tear along a perforated transverse seal, as the orientation in the machine direction can invite tears to stray from the perforation path. In accordance with a preferred embodiment of the present invention, a modified packaging film replaces the OPP of the outer layer with biaxially-oriented high-density polyethylene (BOHDPE) that is more highly oriented in the transverse seal direction than the machine direction. The BOHDPE layer is preferably highly oriented in the transverse direction and only slightly oriented in the machine direction. This modified packaging film containing BOHDPE improves the film's ability to tear in the transverse direction and increases its resistance to tearing in the machine direction, which therefore improves the reliability of separation along perforated transverse seals. Enhanced ability to tear in the transverse direction allows perforations to be spaced further apart, which increases the strength and durability of perforated seals. Therefore, the modified packaging film improves both the reliability of separation and the potential strength of the seal. In a preferred embodiment, BOHDPE-modified packaging film is used with the present invention's method for forming multi-bag packages. Other film compositions, however, can also be used.

Unlike the packaging film used in standard VFFS machines, which has graphics/text printed vertically, the packaging film of the present invention has graphics/text printed sideways. Furthermore, while prior art film supply rolls have packaging film units that are arranged vertically with respect to each other, a multi-pack film supply roll in accordance with the present invention has packaging film units that are arranged horizontally with respect to each other. For example, the prior art film roll 912 shown in FIG. 9 has graphics printed vertically (in an upright orientation) so that the graphics/text appear either upright or upside down as the film forms into a tube and runs down the VFFS machine. In the prior art film roll 912, the packaging film units, represented by the labels "SNACKS," are linked to one another in vertical fashion with the top of one unit attached to the bottom of the next unit. In contrast, the multi-pack film roll 1012 shown in FIG. 10 has graphics/text printed sideways so that the graphics/text appear sideways as the film forms into a tube and runs down the VFFS machine. The multi-pack film units, represented by the labels "SNACKS," are linked to one another in a horizontal fashion with the left side of one unit attached to the right side of the next unit.

As explained above, the prior art packaging film is oriented to be readable by an operator of the machine as the film travels down the forming tube. This orientation provides graphics on the formed prior art bag that are readable by a consumer when the formed bag is placed on a retail display shelf while resting on its bottom transverse seal. In contrast, the orientation of the graphics on the film packaging for Applicants' invention is 90° off of the prior art orientation, such that the graphics appear sideways as viewed by the operator of the vertical form and fill machine as the film is pulled down the forming tube, as shown in FIG. 10. Unlike the prior art process of forming and filling product bags from top-to-bottom or bottom-to-top, the current invention's process forms and fills multi-pack product packages sideways (i.e. from left-to-right or right-to-left).

The multi-pack packaging film 1010 is taken from the multi-pack film roll 1012 and passed through tensioners 1014 that keep it taut. The film 1010 then passes over a former 1016, which directs the film into a vertical tube around a product delivery cylinder 1018. As the tube is pulled downward by drive belts 1020, the vertical tube of film is sealed along its length by a vertical sealer 1022, forming a back seal 1024. The machine then applies a pair of heat-sealing jaws 1026 against the tube to form a first transverse seal 1028. When the multi-pack package is completed and turned upright so that the connected bags are horizontally adjacent to each other, the first transverse seal 1028 will serve as either the left-most or the right-most vertical seal of the multi-pack package 1030. After the first transverse seal 1028 has been formed, a perforating/cutting knife positioned within one of the heat-sealing jaws 1026 cuts across the sealed area to separate the finished bag 930 below the seal 1028 from the partially completed bag 1032 above the seal. The film tube is then moved downward a first time to draw out another package length. Before the sealing jaws form a second transverse seal, the product to be packaged is dropped through the product delivery cylinder 1018 and is held within the tube above the first transverse seal 1028. The heat-sealing jaws 1026 close again to form a second transverse seal 1028 above the first transverse seal, thereby forming a first bag. The perforating/cutting knife then partially penetrates the second transverse seal 1028 to form perforations along the second seal 1028. The film tube is moved downward a second time to draw out another package length. Another charge of product is dropped through the product delivery cylinder 1018 and is held within the tube above the second transverse seal 1028. The heat-sealing jaws 1026 close again to form a third transverse seal 1028 above the second transverse seal, thereby forming a second bag. If forming a double-bag package 1030, the third transverse seal 1028 is then cut across its width using the perforating/cutting knife to separate the double-bag package 1030 from the vertical tube. The process then repeats itself starting with the step of moving the film tube downward a first time. If forming a multi-pack (multi-bag) package having three or more packages, the third transverse seal is perforated with the perforating/cutting knife, and the vertical tube is repeatedly moved downward, filled with product, and transversely sealed until the desired number of connected bags have been produced. When the last connected bag is sealed, the last transverse seal is then cut across its width to separate the multi-pack/multi-bag package from the vertical tube. Stated in another way, the moving, filling, sealing and perforating steps are repeated until a second to last bag is formed. Then the tube of film is moved a final time down the vertical form, fill and seal machine. Product is introduced a final time into the tube of film, a final transverse seal is formed above the other transverse seals to form a final bag, and the final transverse seal is cut across its width using the perforating/cutting knife to separate the multi-pack package from the tube of film.

If a rotary or continuous type of VFFS machine is used rather than an intermittent-motion type VFFS machine, the same essential steps are performed in a slightly different manner. In a rotary or continuous type VFFS machine, the tube of film is moved downward continuously rather than intermittently. As the tube of film moves downward, a pair of transverse sealing jaws move downward with the tube of film and form a first transverse seal. Once the first seal is formed, a perforating/cutting knife positioned within the transverse sealing jaws completely cuts across the seal to separate the film below the first transverse seal. The transverse sealing jaws and the perforating/cutting knife then rotate upwards in preparation for the next sealing cycle. In the meantime, product is dropped down the forming tube, into the tube of film and is held by the first transverse seal. The transverse sealing jaws again move downward with the tube of film and form a second transverse seal, thereby forming a first bag/pouch. The perforating/cutting knife, which travels along with the sealing jaws, then perforates the second transverse seal by partially piercing the film. Product is again dropped down the forming tube and into the film tube, and the sealing jaws again move upwards in preparation for the next sealing cycle. The sealing jaws then form a third transverse seal to create a second bag. If a double-bag package is to be formed, the perforating/cutting knife then completely cuts across the third transverse seal to separate the double-bag package from the tube of film. If a multi-pack package having three or more connected bags is to be formed, the cycle of sealing, perforating, and filling is repeated until the last bag is sealed. Instead of perforating the last transverse seal, the last transverse seal is completely cut across in order to separate the completed multi-pack package from the tube of film.

No matter which type of VFFS machine is used, the perforating/cutting knife follows a specific cycle of perforating and cutting. The perforating and cutting cycle depends upon the number of bags to be formed per package. A processor, such as a computer or programmable logic controller (PLC), can be used to control the alternating or cyclical operation of the perforating/cutting knife. For example, when making double-bag packages, the perforating/cutting knife can be directed by a processor to alternate between completely cutting across the seal area and perforating by partially penetrating the seal area. When making multi-bag packages having three or more connected pouches or bags, the perforating/cutting knife can be directed by a processor to follow a cycle in which the seal area is completely cut across at the beginning of the cycle but is merely perforated throughout the rest of the cycle. If a four-bag package is being manufactured, for instance, the perforating/cutting knife will be directed to completely cut the first seal and perforate the next three transverse seals before beginning the cycle again.

If desired, a tucking mechanism can be used on one side or both sides of the VFFS machine to form gussets down the length of the tube of film. Such gussets will eventually become the top and/or bottom sides of the multi-bag packages. For example, when a tucking mechanism is used to form gussets on the bottom sides of the multi-bag packages, the resulting packages will have expandable bases that enable each bag to stand upright. Such bottom gussets can also be expanded to give the bags flat bottoms upon which the bags can stand.

Double-Bag Package

Figure 5A:
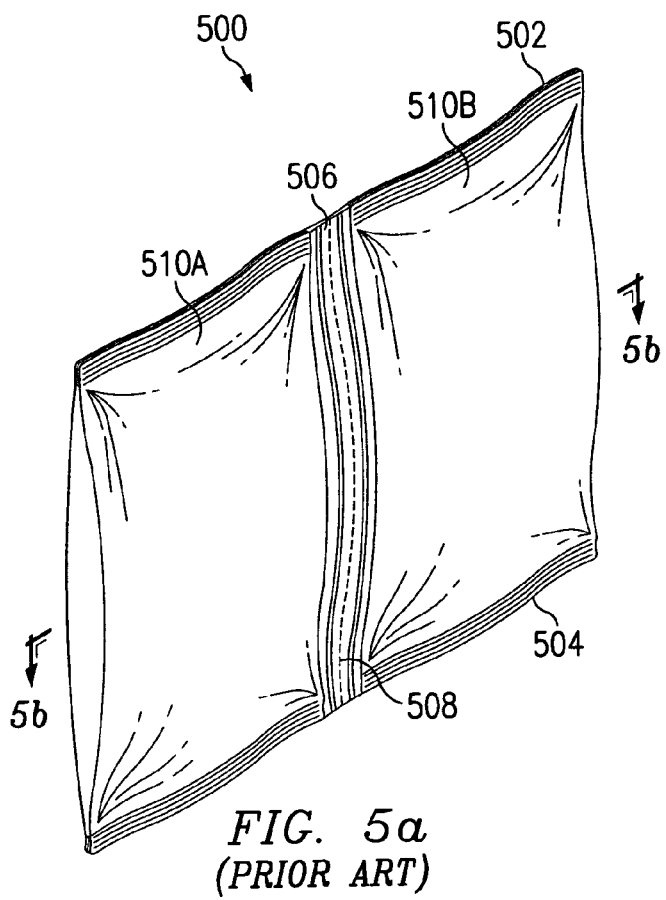
FIG. 5a is a perspective view of a prior art multi-pack package.
Figure 11:
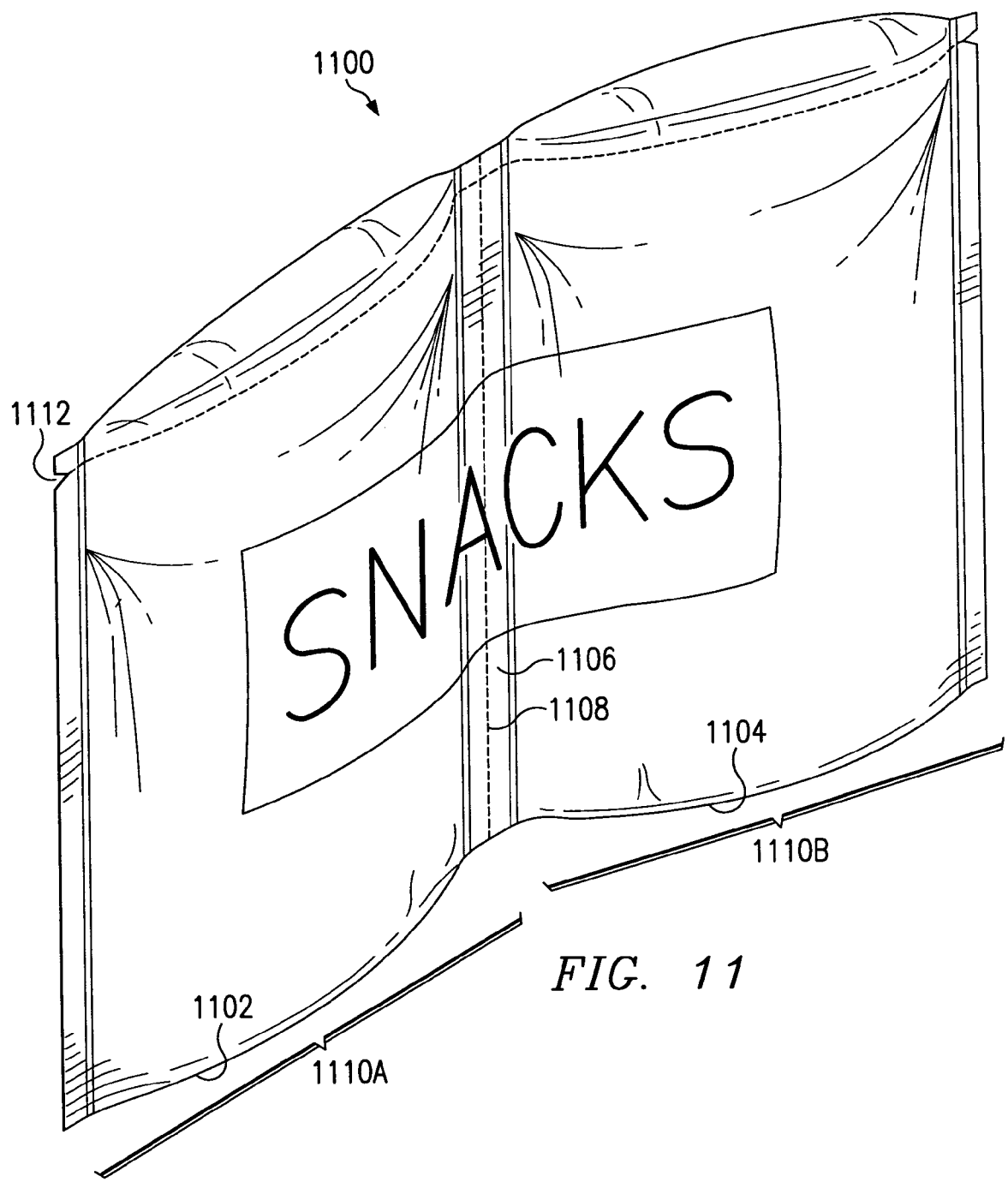
FIG. 11 is a perspective view of a double-bag package, standing upright, in accordance with one embodiment.
Figure 12:
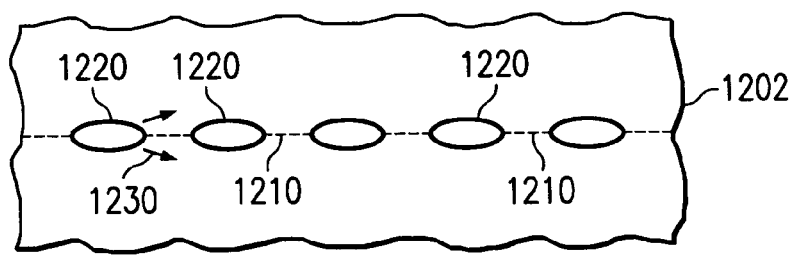
FIG. 12 is a top elevational view of a film having a series of prior art oval-shaped perforations along a perforation path.
Figure 13:
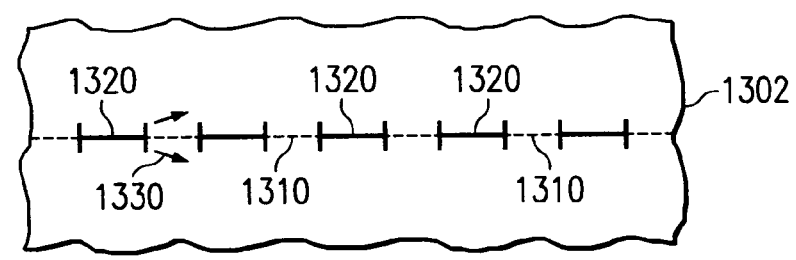
FIG. 13 is a top elevational view of a film having a series of prior art I-shaped perforations along a perforation path.

In a preferred embodiment, the method described above forms a double-bag package having two bags removably attached to each other by a perforated vertical seal. FIG. 11 is a perspective view of a double-bag package 1100, standing upright, in accordance with one embodiment. Unlike the prior art double-bag package shown in FIG. 5a, which has both horizontal and vertical flat seals, the double-bag package 1100 of the present invention has only vertical flat seals. Furthermore, each bag 1110a, 1110b of the double-bag package 1100 of the present invention has two opposing vertical seals, whereas each bag of the prior art double-bag package shown in FIG. 5a has a flat seal on every side but one. Each flat seal flattens the package in the surrounding area, thus decreasing the available volume within the package. Because the double-bag package 1100 of the present invention has fewer flat seals per container than the prior art double-bag package, the double-bag package 1100 of the present invention has more available volume per surface area of film for product than the prior art package.

The double-bag package 1100 shown in FIG. 11 has graphics that are properly viewable when the first bag 1110a and second bag 1110b are horizontally adjacent to each other such that the first, second and third transverse seals 1102, 1106, 1104 are vertically oriented. In this orientation, the front sides of both packages are facing in the same general direction. Because both product bags are formed from the same piece of film and are connected to each other, the graphics/text can be spread or spanned across both bags, if desired. For example, the double-bag package 1100 shown in FIG. 11 has graphics and text that is displayed continuously across both bags such that both bags must be viewed together to properly view the graphics/text. Multi-pack packages made in accordance with the present invention provide a larger surface area across which graphics and text can be displayed. Such packages thus enable large continuous graphics and text displays that were previously not possible with individual prior art packages. With multi-bag packages such as the double-bag package 1100 depicted in FIG. 11, for instance, it is possible to display one or more large, continuous images that extend from the left-most vertical seal of the left-most bag to the right-most vertical seal of the right-most bag without a break in the image.

Figure 5C:
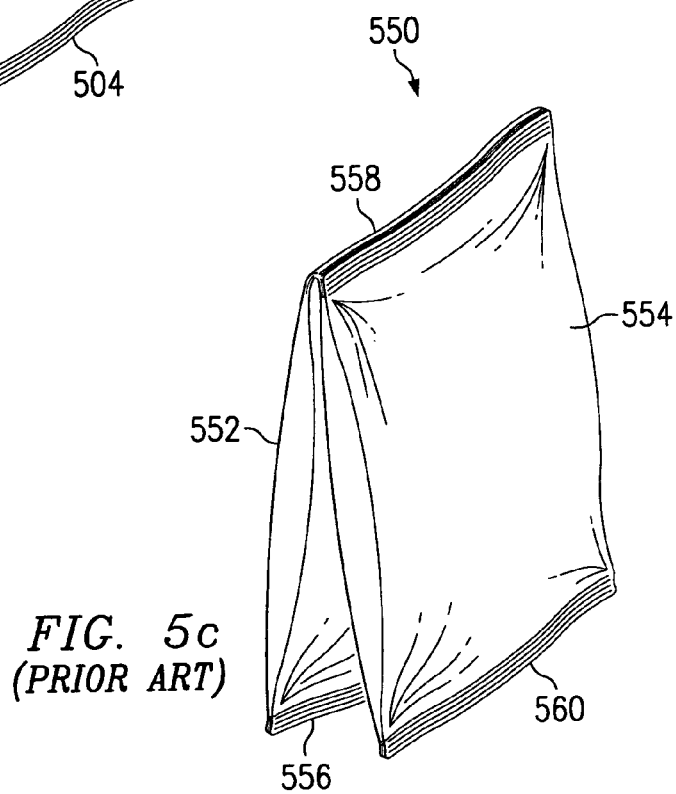
FIG. 5c is a perspective view of a prior art saddle-bag package.
Figure 5B:
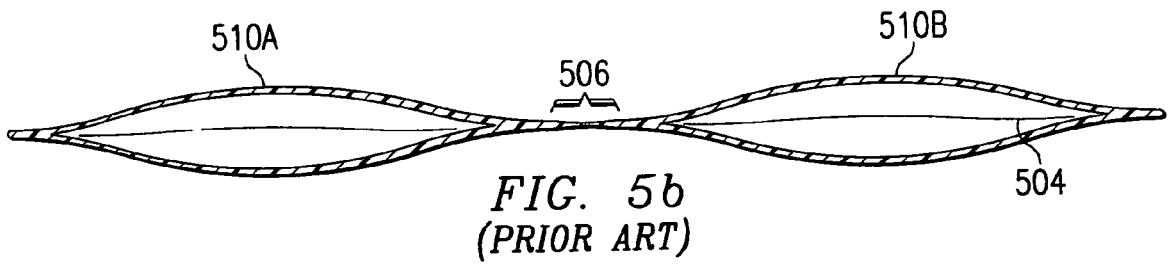
Figure 6B:
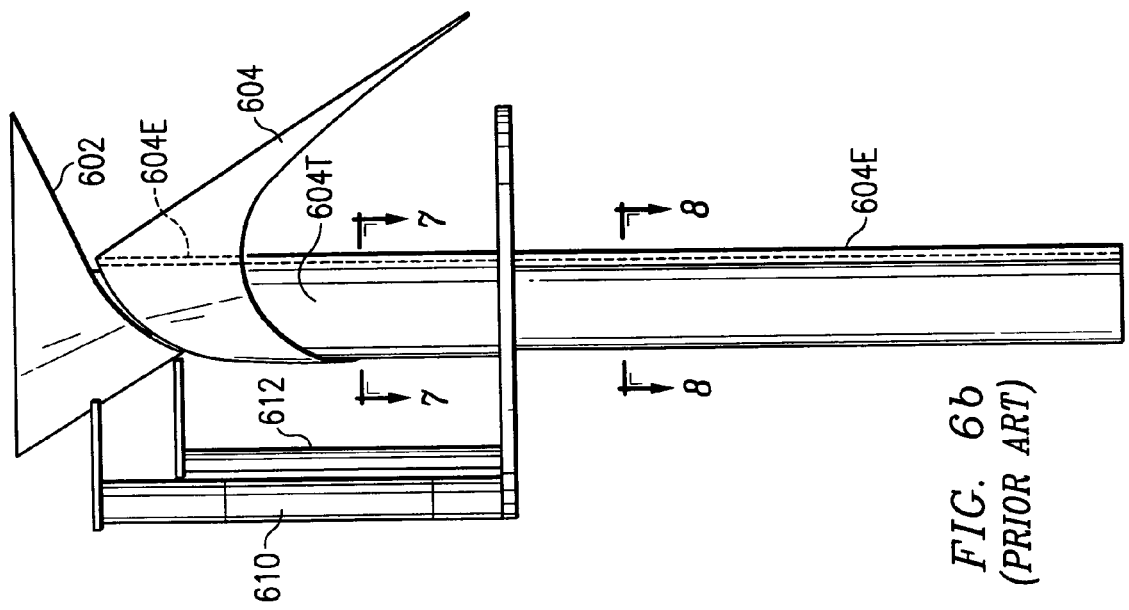
Figure 6A:
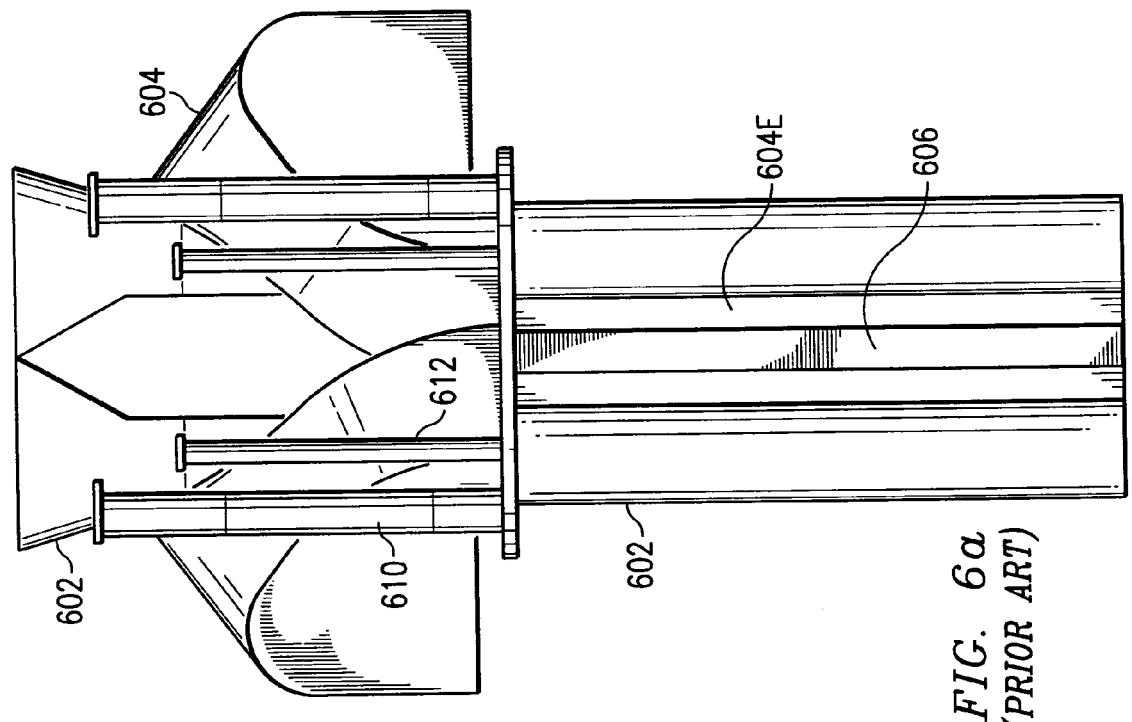
FIG. 6a is a front view of the former/delivery tube assembly of a prior art twin-feed vertical form, fill and seal machine.
Figure 7:
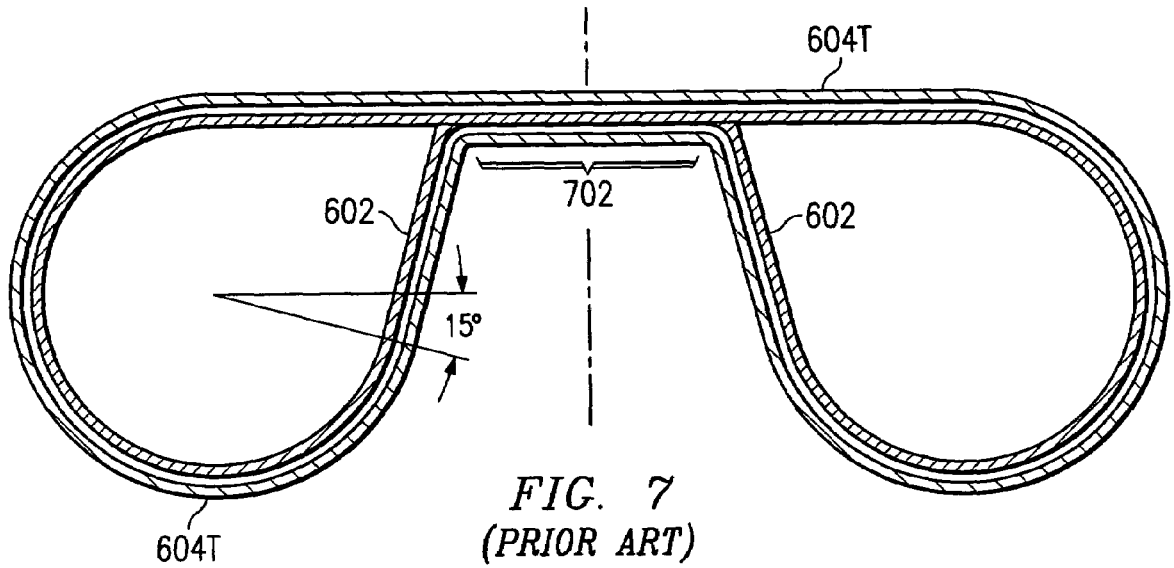
FIG. 7 is a cross-section of the former/delivery tube assembly taken at point 7-7' of FIG. 6b.
Figure 8:
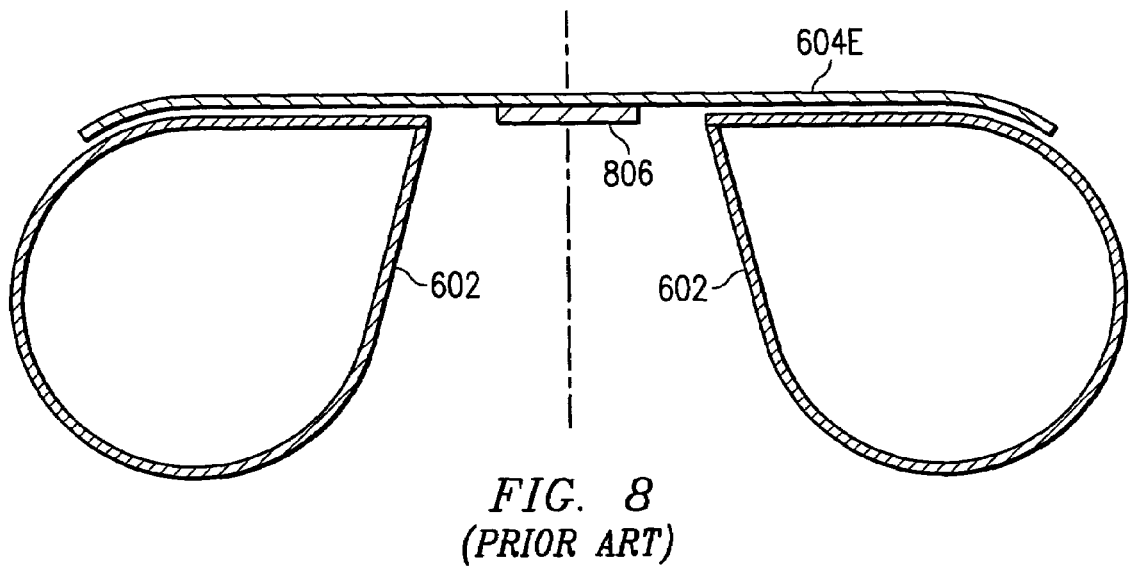
FIG. 8 is a cross-section of former/delivery tube assembly taken at point 8-8' of FIG. 6b.

This ability to span graphics across connected bags is a significant improvement over prior art saddle-bags, an example of which is shown in FIG. 5c. Because the front sides of saddle-bag pouches face opposite directions when the package is in an upright position, it is undesirable to span graphics and text across both pouches. Furthermore, each pouch typically has its own discrete graphics/text unit that is oriented 180 degrees from the graphics/text unit located on the adjacent attached pouch. Thus, it would not be feasible to span graphics across a saddle-bag package because the graphics would appear right-side up on one pouch but up-side down on the attached package.

Another advantage of the multi-pack/multi-bag packages (including double-bag packages) in accordance with the present invention is the ease with which the film can be scored to give the final packaging score lines for easy openability. Whereas score lines must be placed intermittently across the width of a film feed in order to give saddle-bag packages transverse score lines for easy opening, score lines can be continuously placed along the length of a film feed for multi-bag packages (such as double-bag packages) in accordance with the present invention. This is because saddle-bags are formed vertically (bottom-to-top or top-to-bottom) in a VFFS machine with score lines oriented transversely, whereas the present invention's packages are formed sideways (left-to-right or right-to-left) with score lines oriented lengthwise (in the machine direction).

As seen in FIG. 11, the double-bag package 1100 can be angled at the vertical seam 1106 between the two bags 1110a, 1110b so that the front faces of each bag are facing in slightly different directions. The two bags 1110a, 1110b form a v-shape when viewed from above. Positioning the bags 1110a, 1110b at an angle allows the double-bag package 1100 to stand upright without external support. A multi-pack package having three or more connected bags can be similarly positioned to enable it to stand upright without external support. Such a multi-pack package can be placed in a zig-zag orientation, for example. Any arrangement of the bags that is non-linear when viewed above will help give the package the stability required to stand upright.

If the VFFS machine used to make the double-bag package 1100 includes a tucking mechanism, the double-bag package 1100 can also have a gusseted (creased) or flat bottom. Bottom gussets (creases) or flat bottoms provide stable bases upon which the package can stand upright. In addition, such gusseted or flat bottoms enable each individual package to stand upright even after they are separated from one another.

If desired, the double-bag package 1100 can also include score lines near the top of the bags to guide tears initiated at pre-cut slits 1112 across the top of the bags for easy opening. Score lines can be pre-existing in the multi-pack packaging film. For example, the score lines can be made on one or more layers of the packaging film during manufacturing/lamination. Before all of the layers are laminated together, one or more layers can be slit-scored. In a preferred embodiment, three parallel slit-scores are placed on one of the outer layers so that the inner barrier layer is not disturbed while simultaneously providing several guiding slits for tearing.

Self-Correcting Perforations

The vertical seal 1106 that connects the two bags 1110a, 1110b of the double-bag package 1100 shown in FIG. 11 can have various means or aides for separation, which include but are not limited to score lines, one or more lengthwise slits, and perforations. If desired, the vertical seal 1106 connecting the two bags 1110a, 1110b can even be completely cut along its length to initially separate the two bags 1110a, 1110b, and then the two sides of the seal can be rejoined with an adhesive that allows for easy separation. In a preferred embodiment, the vertical seal 1106 connecting the two bags 1110a, 1110b has perforations 1108 so that the two bags can be easily separated. If a film having little or no orientation is used, such as low-density polyethylene (LDPE), prior art perforation patterns will suffice to enable the packages to be separated along their shared seal. In such a case, the perforated seal can be torn in either direction, from top to bottom or from bottom to top. If an oriented packaging film is used, however, the connected bags may not separate cleanly along the desired perforation path. Oriented films such as biaxially oriented polypropylene (BOPP) will not necessarily tear in the direction of a given tearing force and may instead tear in the direction or directions of orientation (or stretching). Furthermore, even if the desired perforation path runs in the general direction of orientation, the film may not tear exactly along the desired path.

In a preferred embodiment, the vertical seal between the two bags of a double-bag package has perforation patterns that are capable of capturing and redirecting errant tears for fail-safe directional separation. Each of the perforation patterns has a wide base for catching an errant leading tear and at least one apex incision connecting the wide base to the desired perforation path. Perforation patterns that have wide bases and apex incisions include but are not limited to T-shapes, triangles, kites, hearts, arrowheads and chevrons. The perforation patterns are spaced along a desired perforation path and are arranged so that the wide base of one pattern is near the apex of the next/previous pattern. The wide base of each pattern should extend beyond the perforation path on both sides so that it can catch an errant tear propagating from the apex of the previous pattern. Furthermore, the perforation patterns should be spaced close enough together so the wide bases of the patterns can catch an errant tear from the previous pattern. As a tear propagates through a perforation pattern, the tear will be redirected to the apex of the pattern along the desired perforation path. A tear then initiates at the apex of the pattern and will then propagate towards the wide base of the next pattern. No matter where the tear encounters the base of the next pattern, the tear will be redirected to the apex of the next pattern. This self-correcting characteristic of the perforation patterns provides a fail-safe means for controllably separating attached packages. Note, however, that such directional perforations must be torn from the apex of one perforation towards the base of the next perforation, or in that general direction, in order for the self-correcting perforations to properly capture and redirect errant tears.

Whereas perforations previously had to be spaced very close to one another, especially in films having poor tearing characteristics, the self-correcting perforation patterns of the present invention now allow perforations to be spaced a greater distance apart while still allowing a reliable separation. This increases the strength of the perforated seal connecting two adjacent packages. Increased strength allows the multi-bag packages to withstand more shipping and handling stress before suffering from premature separation.

Figure 14:
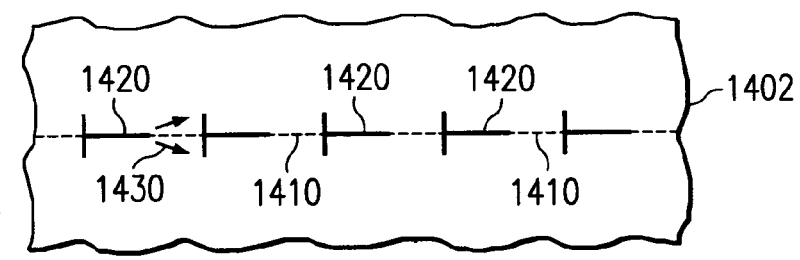
FIG. 14 is a top elevational view of a film having a series of T-shaped perforations in accordance with one embodiment of the present invention.

FIG. 14 is a top elevational view of a film 1402 having a series of T-shaped perforations 1420 in accordance with one embodiment of the present invention. Each one of the T-shaped perforations has a wide base incision that is perpendicular to the perforation path 1410. An apex incision runs along the perforation path 1410 and connects the center of the wide base incision to the apex of the pattern, which is the right-most portion of each pattern 1420 shown in FIG. 14. As a tear propagates through one of the T-shaped perforations 1420 from its base towards its apex, the tear is redirected to the apex of the pattern. Even if the tear from the apex 1430 wanders off the perforation path 1410, it will be caught and redirected by the wide base of the next T-shaped perforation 1420.

Figure 15:
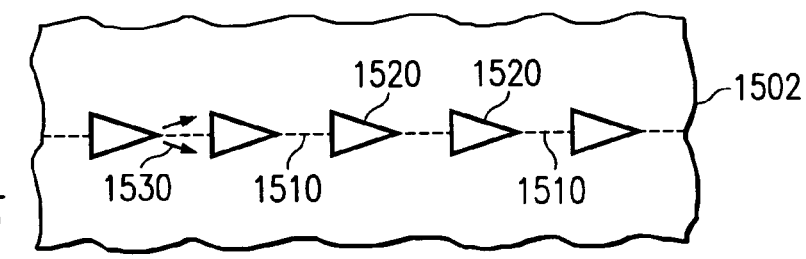
FIG. 15 is a top elevational view of a film having a series of triangular-shaped perforations in accordance with one embodiment of the present invention.

FIG. 15 is a top elevational view of a film 1502 having a series of triangular-shaped perforations 1520 in accordance with one embodiment of the present invention. Each one of the triangular-shaped perforations 1520 has a wide base that is perpendicular to the perforation path 1510. Two apex incisions connect the ends of the wide base to the apex of the pattern, which is located on the perforation path 1510. The apex of the pattern is the right-most portion of each pattern 1520 shown in FIG. 15. As a tear propagates through one of the triangle-shaped perforations 1520 from its base towards its apex, the tear is redirected to the apex of the pattern. Even if the tear from the apex 1530 wanders off the perforation path 1510, it will be caught and redirected by the wide base of the next T-shaped perforation 1520.

Figure 16:
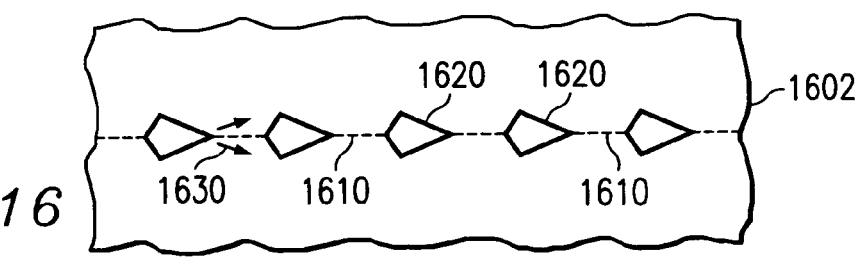
FIG. 16 is a top elevational view of a film having a series of diamond-shaped perforations in accordance with one embodiment of the present invention.

FIG. 16 is a top elevational view of a film 1602 having a series of kite-shaped perforations 1620 in accordance with one embodiment of the present invention. Each one of the kite-shaped perforations 1620 has a wide base that extends beyond the perforation path 1610 on both sides. Two apex incisions connect the ends of the wide base to the apex of the pattern, which is located on the perforation path 1610. The apex of the pattern is the right-most portion of each pattern 1620 shown in FIG. 16. As a tear propagates through one of the kite-shaped perforations 1620 from its base towards its apex, the tear is redirected to the apex of the pattern. Even if the tear from the apex 1630 wanders off the perforation path 1610, it will be caught and redirected by the wide base of the next T-shaped perforation 1620.

Perforating/Cutting Knife

Figure 17A:
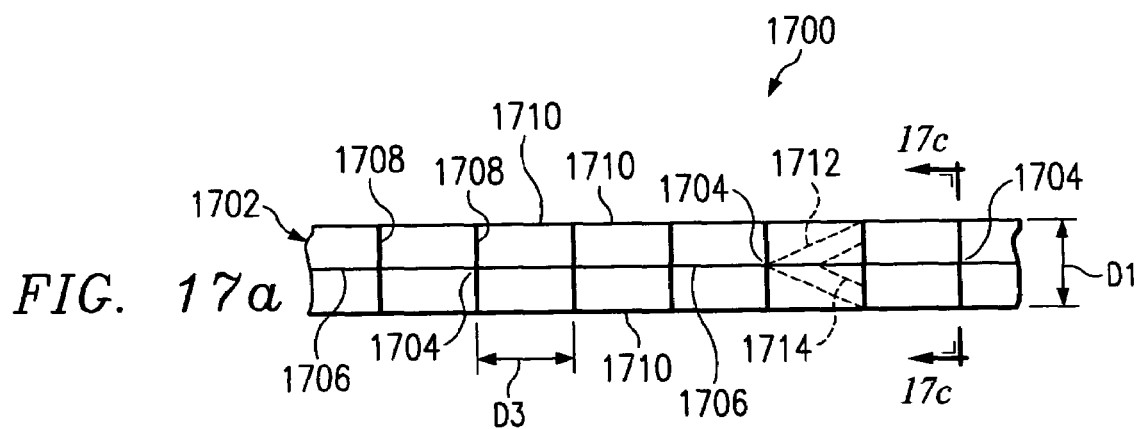
FIG. 17a is a top elevational view of a perforating blade capable of creating T-shaped perforations in accordance with one embodiment of the present invention.
Figure 17B:
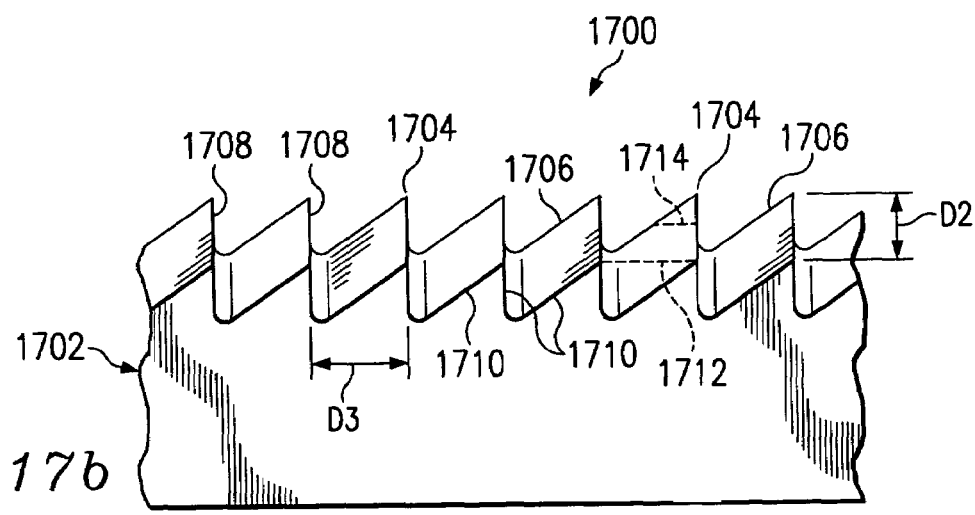
Figure 17C:
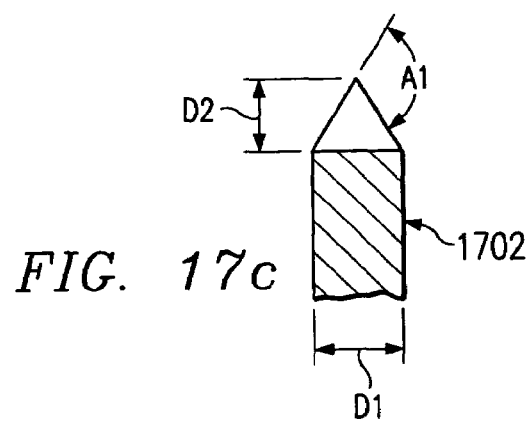
FIG. 17c is a front cross-sectional view of the perforating blade shown in FIG. 17a taken at 17c-17c'.
Figure 17D:
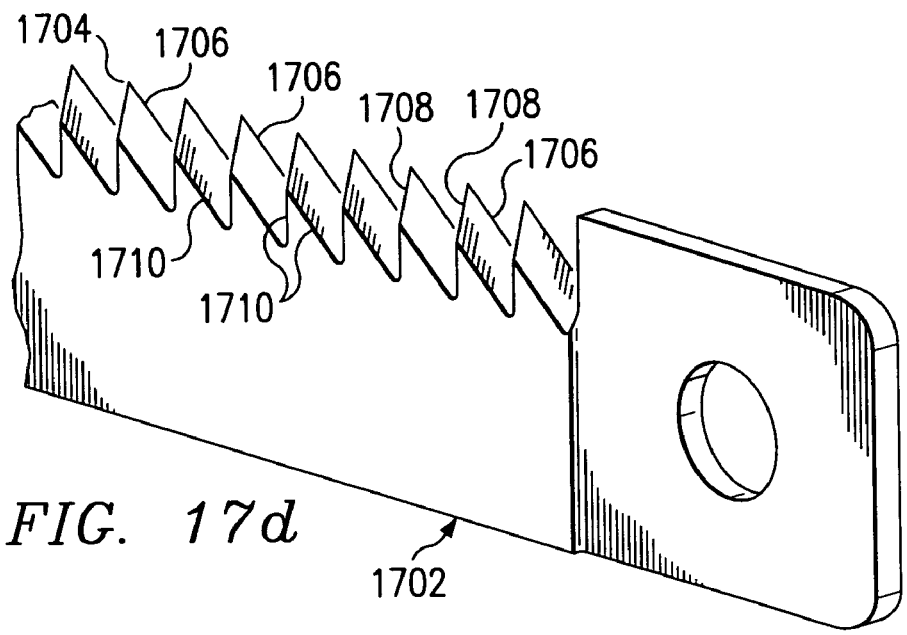
Figure 18A:
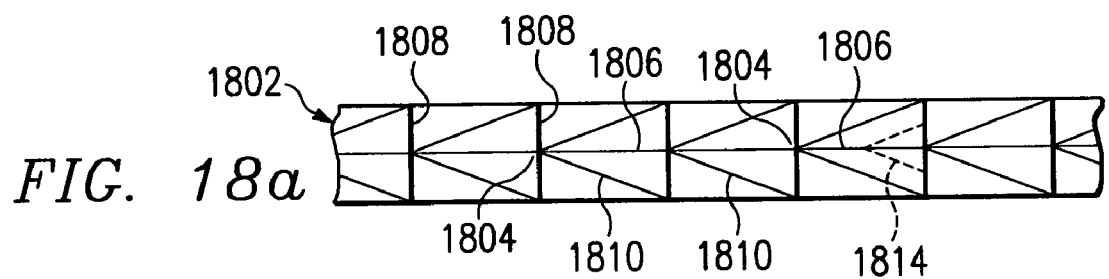
FIG. 18a is a top elevational view of another perforating blade capable of creating T-shaped perforations in accordance with one embodiment of the present invention.
Figure 18B:
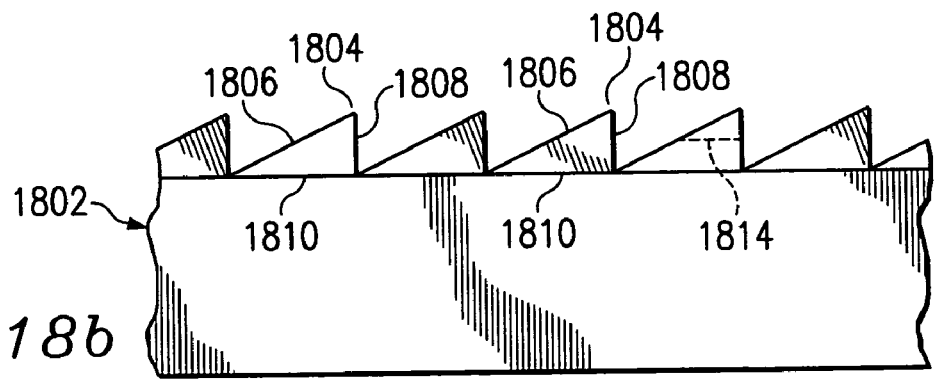
Figure 19:
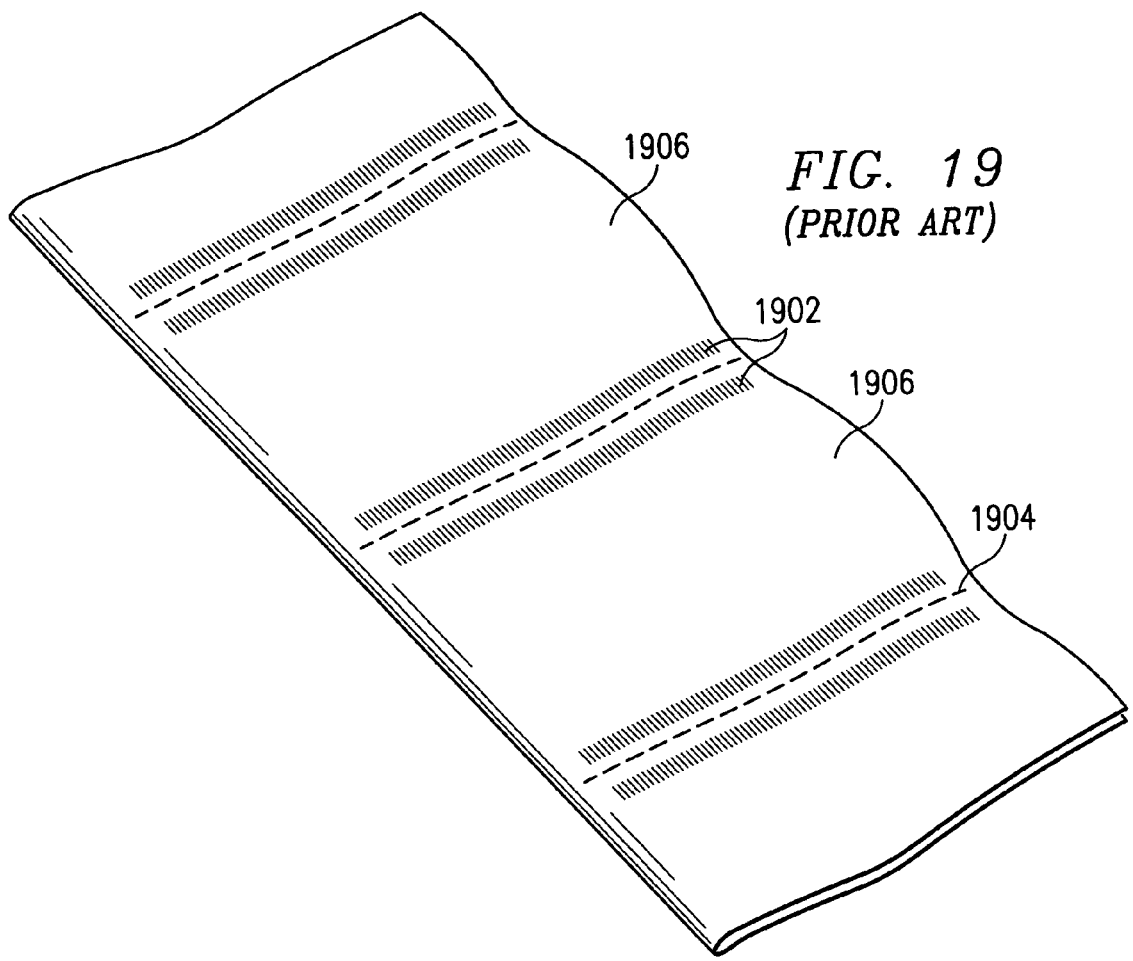
FIG. 19 is an overhead drawing of a string of bags separated by perforations according to the prior art and disclosed by U.S. Pat. No. 5,094,657.

FIG. 17a is a top elevational view of a perforating knife (or blade) 1700 capable of creating T-shaped perforations, such as the T-shaped perforations 1420 shown in FIG. 14, in accordance with one embodiment of the present invention. FIG. 17b is a side elevational view of the perforating blade shown in FIG. 17a. FIG. 17c is a front cross-sectional view of the perforating blade shown in FIG. 17a taken at 17c-17c'. FIG. 17d is a perspective view of the perforating blade shown in FIG. 17a. FIG. 18a is a top elevational view of another perforating blade capable of creating T-shaped perforations in accordance with one embodiment of the present invention. FIG. 18b is a side elevational view of the perforating blade shown in FIG. 18a.

Each perforating knife of the embodiments shown in FIGS. 17a-d and 18a-b has an elongate base 1702, 1802 upon which perforating teeth are located in single file. Each tooth has the shape of an oblique triangular pyramid. The base of the pyramid is an isosceles triangle (shown as the bottom contour line 1712 in FIG. 17a, and outlined by the tooth-bottom edge lines 1810 shown in FIG. 18a) having a first, second and third side. While the base has at least two equal sides, the base can also have three equal sides (as "isosceles" means at least two equal sides). One face of the pyramid (the "vertical face") 1708, 1808 has a normal vector that is parallel to the elongate base 1702, 1802 of the knife (and is thus perpendicular to the length of the knife). The first side is at the base of the vertical face 1708, 1808 and runs along the width of the knife. The second and third sides run from the ends of the first side to the centerline 1706, 1806 of the knife. The apex ("the center apex") 1704, 1804 of the pyramid shape is located along the centerline 1706, 1806 above the first side. The apex 1704, 1804 and the first side are both contained within a vertical face 1708, 1808 of the pyramid. Contour lines 1712, 1714, 1814 help show the shape of the each tooth.

Each tooth has three cutting edges. A centerline cutting edge 1706, 1806 connects the center apex 1704, 1804 to the intersection of the second and third sides. Two base cutting edges connect the center apex 1704, 1804 to the ends of the first side. When the knife is pressed into a sheet of film, the center apexes 1704, 1804 of the teeth first pierce the sheet. As the knife is pressed further into the sheet of film, the two base edges form a wide base incision that runs perpendicular to the length of the knife. The centerline edge 1706, 1806 forms an apex incision that extends from the center of the wide base incision out along the perforation path towards the next perforation. The size of the perforations can be controlled by controlling the depth to which the knife pierces the sheet of film. The embodiments of perforating/cutting knives shown in FIGS. 17a-d and 18a-b can be used to form the perforation patterns shown in FIG. 14. If heated enough to melt or soften the film to be perforated, the perforating/cutting knives can also form the patterns shown in FIG. 15. In addition, the perforating knife can also be used to completely cut through a film.

In FIGS. 17a-d, the center apex 1704 is the highest point of the vertical face 1708 that is perpendicular to the length of the blade. The vertical face 1708 has a triangular upper portion. A surface centerline 1706 follows the surface of the knife along the knife's center and runs from one centerline cutting edge 1706 to the next. When viewed from the side, as shown in FIG. 17b, the surface centerline 1706 and two top edge lines 1710 on either side of the centerline all follow zig-zag patterns down the length of the knife. The surface centerline 1706 drops downward at an angle from a center apex to a center low point at the vertical face 1708 of the next tooth where it rises vertically (or perpendicular to the length of the knife) to the next apex. Each of the two top edge lines 1706 runs parallel to the centerline 1706 at a lower elevation, dropping at an angle from an edge apex to an edge low point before rising vertically to the next edge apex. The surface centerline 1706, top edge lines 1706 and the base cutting edges (the top edges of the vertical faces 1708) define the top surfaces of the blade's teeth.

In a preferred embodiment, the width D1 of the perforating knife is approximately 0.0625 inches. The height D2 of the perforating portion of each tooth is preferably about 0.0541 inches. The length D3 of each tooth is preferably about 0.1964 inches. The angle A1 between the line containing one base cutting edge and the connected base cutting edge is preferably about 120 degrees, which means that each vertical face forms an equilateral triangle.

In another embodiment, the width D1 of the perforating knife is approximately 0.188 inches. The height D2 of the perforating portion of each tooth is about 0.1628 inches. The length D3 of each tooth is about 0.094 inches. The angle A1 between the line containing one base cutting edge and the connected base cutting edge is about 120 degrees.

In yet another embodiment, the width D1 of the perforating knife is approximately 0.188 inches. The height D2 of the perforating portion of each tooth is about 0.1628 inches. The length D3 of each tooth is about 0.112 inches. The angle A1 between the line containing one base cutting edge and the connected base cutting edge is about 120 degrees.

Bandolier Format Packaging

Individual bags or packages of snack foods and other food products are generally shipped, displayed, purchased and consumed disconnected from other bags. Individual bags are produced at a factory and loosely packed in large shipping containers before eventually reaching retail outlets. Such packing, shipping and handling of these bags from factory to retail outlet is relatively inefficient as they occupy relatively large volumes of space compared to the actual volume of product reaching a consumer.

One method to facilitate packing, shipping and handling of these packages is to form them into a string of packages. In one embodiment of the present invention, a string of individual food packages is formed at the time of manufacture. As food product is introduced into a bag, two or more bags are not separated from each other. However, a perforation is formed between successive bags. Such perforation allows separation of individual bags at a later time.

In another embodiment, a string of bags is produced on a vertical form, fill, and seal (VFFS) machine. A VFFS machine first creates a tube of packaging material, seals one end of the tube, and drops food product into the other, open end of the tube. Normally, after food product is introduced into the open end, a package is formed by sealing the open end and cutting the package free from the tube of packaging material above the newly formed seal. The process is again repeated to make subsequent packages.

According to the present invention, a perforation, not a cut, is made between sequential packages made on a VFFS machine. Sequential packages are instead packaged as a string of packages made from the tube of packaging material. A string of packages having an arbitrary number of packages is thus formed. Such string of packages is more easily packaged and handled than the same number of individual packages.

Figure 20A:
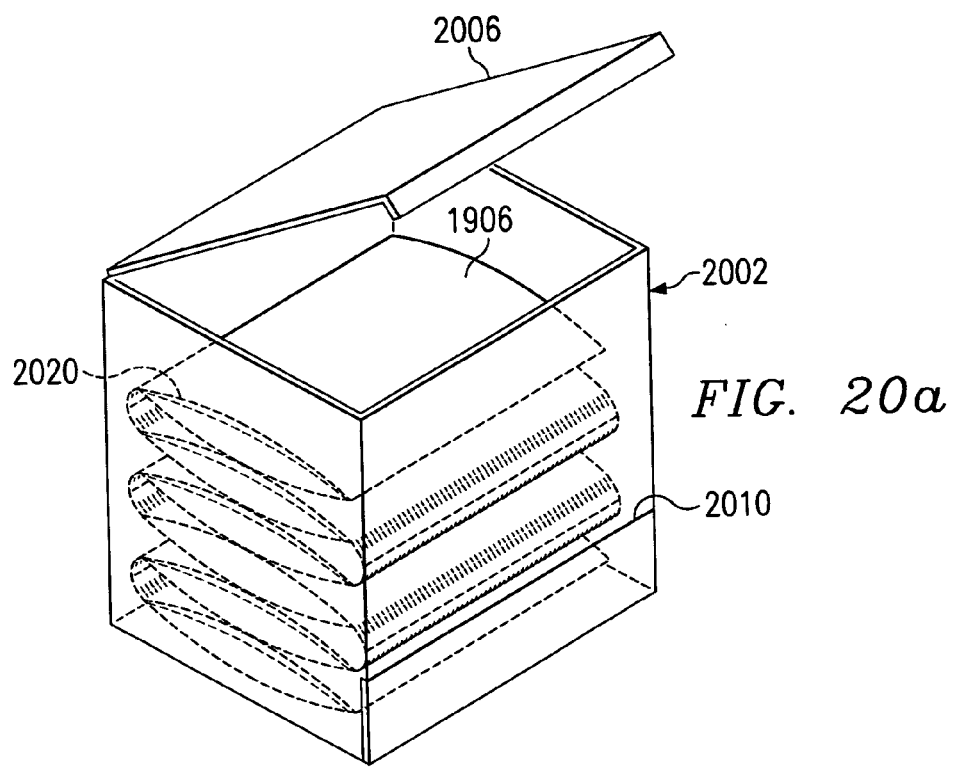
FIG. 20a is a perspective view of a string of bags in a closed dispenser according to the present invention; and, FIG. 20b is a perspective view of a string of bags in an open dispenser according to the present invention.

A string of packages may be placed in one embodiment of a dispenser such as the one shown in FIG. 20a. With reference to FIG. 20a, a string of packages 2020 may be placed inside a dispenser 2002 through an opening with a re-closeable flap 2006. Such dispenser 2002 may be more easily handled in the chain of distribution to the ultimate consumer than individual packages 1906 of products. Such dispenser 2002 provides increased protection to the string of packages 2020 as compared to the handling of an equivalent number of individual packages 1906. A dispensing slit 2010 may be formed on one or more sides of a dispenser 2002.

With reference to FIG. 20b, a dispensing opening 2004 may be made by opening a dispensing flap 2008 which enlarges a dispensing slit 2010 where such slit 2010 is shown in FIG. 20a. A loose end 2024 of a string of packages 2020 may be extended from a dispensing opening 2004. A user may separate one or more packages 1906 by tearing a perforation 1904 between successive packages 1906. The remainder of the packages 2026 remains inside the dispenser 2002. A string of packages 2020 may be introduced into a dispensing container 2002 through a dispensing opening 2004 instead of an opening having a re-closeable flap 2006. When all individual packages 2026 have been consumed, another string of packages 2020 may be reloaded into an existing dispenser 2002.

A dispenser 2002 of packages 1906 may be maintained in a variety of settings including, but not limited to, a pantry, store shelf, kitchen counter, concession stand, recreational vehicle, garage, or other desired location. When such dispenser 2002 is displayed in a retail setting, individual packages 1906 may be for individual resale. For individual resale, it would then be required to separate one or more individual packages 1906 before purchasing them. A package dispenser 2002 facilitates the storage, display and sale of individual packages 1906 and string of packages 2020. Such package dispenser 2002 is particularly advantageous when used in conjunction with a string of packages 2020 wherein a package contains one or more servings of a food product.

While the invention has been particularly shown and described with reference to a preferred embodiment, it will be understood by those skilled in the art that various changes inform and detail may be made therein without departing from the spirit and scope of the invention.

We claim:

1. A method for forming, packaging, and dispensing a string of sealed food product packages using a vertical form, fill and seal machine, said method comprising the steps of:

(a) guiding a packaging material into a position such that said packaging material is wrapped around a delivery tube of said form, fill and seal machine, wherein said packaging material comprises oriented graphics which appear sideways as the packaging material is fed through a vertical form, fill and seal machine;

(b) sealing adjacent portions of said packaging material to form a tube of packaging material;

(c) for each of said packages:
 (1) forming a first transverse seal across said tube of packaging material;
 (2) delivering a product into said tube of packaging material above said first transverse seal; and,
 (3) forming a second transverse seal across said tube of packaging material using a heat-sealing jaw assembly to create a sealed package filled with said product;

(d) creating a transverse line of perforations along said second transverse seal using a knife positioned within said heat-sealing jaw assembly; and, (e) placing said string of sealed food product packages in a package dispenser having a closeable opening via said closeable opening, such that said dispenser holds two or more sealed food packages;

(f) dispensing a loose end of said string of sealed food product packages from a dispensing opening, wherein said oriented graphics are properly viewable when said transverse seals are vertically oriented.

2. The method of claim 1 wherein each of said packages is a flexible multi-pack package comprising:
 a first bag having a first transverse seal, and a second transverse seal, wherein the first transverse seal and the second transverse seal are on opposite sides of the first bag; and,
 a second bag having a third transverse seal, wherein said second bag shares the second transverse seal with the first bag and is flexibly attached to said first bag by the second transverse seal, and further wherein the second transverse seal and the third transverse seal are on opposite sides of the second bag; wherein the first, second and third transverse seals are parallel to each other.

3. The method of claim 1 wherein said packaging material is a packaging film comprising at least one layer selected from the group consisting of polypropylene, polyester, polyethylene, paper, polyolefin extrusions, and adhesive laminates, or any combinations thereof.

* * * * *